US011849790B2

United States Patent
Cheng et al.

(10) Patent No.: US 11,849,790 B2
(45) Date of Patent: Dec. 26, 2023

(54) APPAREL FITTING SIMULATION BASED UPON A CAPTURED TWO-DIMENSIONAL HUMAN BODY POSTURE IMAGE

(71) Applicant: Liwei Cheng, Beijing (CN)

(72) Inventors: Liwei Cheng, Beijing (CN); Wei Hu, Beijing (CN)

(73) Assignee: Liwei Cheng, Beijing (CN)

( * ) Notice: Subject to any disclaimer, the term of this patent is extended or adjusted under 35 U.S.C. 154(b) by 7 days.

(21) Appl. No.: 17/639,965

(22) PCT Filed: Sep. 3, 2020

(86) PCT No.: PCT/CN2020/113198
§ 371 (c)(1),
(2) Date: May 25, 2022

(87) PCT Pub. No.: WO2021/043204
PCT Pub. Date: Mar. 11, 2021

(65) Prior Publication Data
US 2022/0322775 A1    Oct. 13, 2022

(30) Foreign Application Priority Data
Sep. 3, 2019   (CN) .......................... 201910827228.0

(51) Int. Cl.
*A41H 3/00*    (2006.01)
*G06T 7/60*    (2017.01)
*G06T 13/40*   (2011.01)

(52) U.S. Cl.
CPC .............. *A41H 3/007* (2013.01); *G06T 7/60* (2013.01); *G06T 13/40* (2013.01); *G06T 2210/16* (2013.01)

(58) Field of Classification Search
None
See application file for complete search history.

(56) References Cited

U.S. PATENT DOCUMENTS

2001/0026272 A1\* 10/2001 Feld ....................... A41H 3/007
345/585
2013/0243259 A1   9/2013 Kawaguchi et al.
(Continued)

FOREIGN PATENT DOCUMENTS

| CN | 106920146 A | 7/2017 |
| CN | 107622428 A | 1/2018 |

(Continued)

OTHER PUBLICATIONS

Rogge et al.; "Garment Replacement in Monocular Video Sequences;" ACM Transactions on Graphics, vol. 34, No. 1, Article 6, 10 pages; Publication date: Nov. 2014 (Year: 2014).\*

(Continued)

*Primary Examiner* — Edward Martello
(74) *Attorney, Agent, or Firm* — Ruggiero McAllister & McMahon LLC

(57) ABSTRACT

The present disclosure discloses a method and apparatus for processing data, a computer device and computer-readable storage medium. The method comprises: acquiring image data of a human body; identifying a two-dimensional posture of the human body based on the image data; comparing the identified two-dimensional posture to a posture database to determine preset parts of the two-dimensional posture; and assigning cloth physical property of to-be-tried-on apparel to a part of the preset parts of the two-dimensional posture covered by original apparel. The present disclosure can greatly improve the efficiency of data processing, thereby improving user experiences.

10 Claims, 13 Drawing Sheets

(56) References Cited

U.S. PATENT DOCUMENTS

| | | | | |
|---|---|---|---|---|
| 2013/0249908 A1* | 9/2013 | Black | .................... | G06T 15/20 |
| | | | | 345/420 |
| 2015/0134493 A1* | 5/2015 | Su | .................. | G06T 15/005 |
| | | | | 705/27.2 |
| 2019/0043269 A1* | 2/2019 | Lin | .................. | G06T 7/62 |

FOREIGN PATENT DOCUMENTS

| | | |
|---|---|---|
| CN | 107977885 A | 5/2018 |
| CN | 108460338 A | 8/2018 |

OTHER PUBLICATIONS

International Search Report dated Dec. 4, 2020 for PCT Appl. No. PCT/CN2020/113198.

\* cited by examiner overwriting original apparel data of the arm part of the two-dimensional human body posture with to-be-tried-on apparel data of the arm part of the two-dimensional human body basic posture based on a posture change of the arm part of the two-dimensional human body posture, so as to form an arm part containing the to-be-tried-on apparel data; wherein a first preset vertex and a first preset boundary of the to-be-tried-on apparel data of the arm part of the two-dimensional human body basic posture coincide respectively with a first preset vertex and a first preset boundary of the original apparel data of the arm part of the two-dimensional human body posture, or a second preset boundary and a second preset boundary center of the to-be-tried-on apparel data of the arm part of the two-dimensional human body basic posture coincide respectively with a second preset boundary and a second preset boundary center of the original apparel data of the arm part of the two-dimensional human body posture ⎯ 701

↓ overwriting original apparel data of the trunk part of the two-dimensional human body posture with to-be-tried-on apparel data of the trunk part of the two-dimensional human body basic posture, so as to form a trunk part containing the to-be-tried-on apparel data; wherein a third preset vertex and a third preset boundary of the to-be-tried-on apparel data of the trunk part of the two-dimensional human body basic posture coincide respectively with a third preset vertex and a third preset boundary of the original apparel data of the trunk part of the two-dimensional human body posture, or a fourth preset boundary and a fourth preset boundary center of the to-be-tried-on apparel data of the trunk part of the two-dimensional human body basic posture coincide respectively with a fourth preset boundary and a fourth preset boundary center of the original apparel data of the trunk part of the two-dimensional human body posture ⎯ 702

FIG. 7 overwriting original apparel data of the arm part of the two-dimensional human body posture with to-be-tried-on apparel data of the arm part of the two-dimensional human body basic posture based on a posture change of the arm part of the two-dimensional human body posture, so as to form an arm part containing the to-be-tried-on apparel data; wherein a first preset vertex and a first preset boundary of the to-be-tried-on apparel data of the arm part of the two-dimensional human body basic posture coincide respectively with a first preset vertex and a first preset boundary of the original apparel data of the arm part of the two-dimensional human body posture, or a second preset boundary and a second preset boundary center of the to-be-tried-on apparel data of the arm part of the two-dimensional human body basic posture coincide respectively with a second preset boundary and a second preset boundary center of the original apparel data of the arm part of the two-dimensional human body posture — 701 stretching or rebounding the to-be-tried-on apparel data of the arm part of the two-dimensional human body basic posture in an extension direction of the arm part of the two-dimensional human body posture based on a tension of the cloth physical property of the original apparel and a tension of the cloth physical property of the to-be-tried-on apparel, so as to form an arm part containing the to-be-tried-on apparel data that has been stretched or rebounded — 1001 overwriting original apparel data of the trunk part of the two-dimensional human body posture with to-be-tried-on apparel data of the trunk part of the two-dimensional human body basic posture, so as to form a trunk part containing the to-be-tried-on apparel data; wherein a third preset vertex and a third preset boundary of the to-be-tried-on apparel data of the trunk part of the two-dimensional human body basic posture coincide respectively with a third preset vertex and a third preset boundary of the original apparel data of the trunk part of the two-dimensional human body posture, or a fourth preset boundary and a fourth preset boundary center of the to-be-tried-on apparel data of the trunk part of the two-dimensional human body basic posture coincide respectively with a fourth preset boundary and a fourth preset boundary center of the original apparel data of the trunk part of the two-dimensional human body posture — 702 stretching or rebounding the to-be-tried-on apparel data of the trunk part of the two-dimensional human body basic posture in an extension direction of the trunk part of the two-dimensional human body posture based on the tension of the cloth physical property of the original apparel and the tension of the cloth physical property of the to-be-tried-on apparel, so as to form a trunk part containing the to-be-tried-on apparel data that has been stretched or rebounded — 1002

FIG. 10

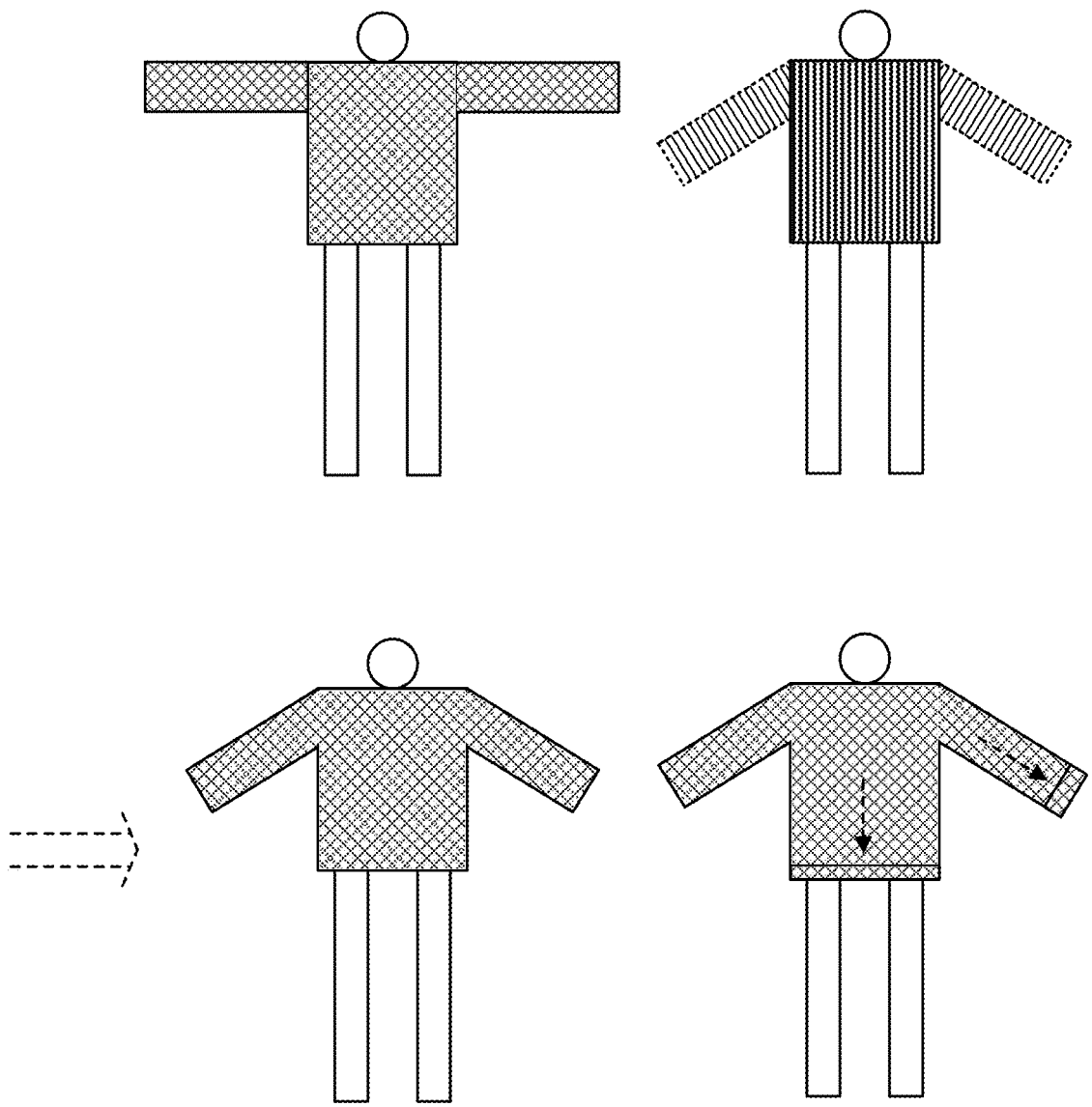

FIG. 12 overwriting original apparel data of the leg part of the two-dimensional human body posture with to-be-tried-on apparel data of the leg part of the two-dimensional human body basic posture, so as to form a leg part containing the to-be-tried-on apparel data; wherein a fifth preset vertex and a fifth preset boundary of the to-be-tried-on apparel data of the leg part of the two-dimensional human body basic posture coincide respectively with a fifth preset vertex and a fifth preset boundary of the original apparel data of the leg part of the two-dimensional human body posture, or a sixth preset boundary and a sixth preset boundary center of the to-be-tried-on apparel data of the leg part of the two-dimensional human body basic posture coincide respectively with a sixth preset boundary and a sixth preset boundary center of the original apparel data of the leg part of the two-dimensional human body posture ⟵ 1301

FIG. 13 overwriting original apparel data of the leg part of the two-dimensional human body posture with to-be-tried-on apparel data of the leg part of the two-dimensional human body basic posture, so as to form a leg part containing the to-be-tried-on apparel data; wherein a fifth preset vertex and a fifth preset boundary of the to-be-tried-on apparel data of the leg part of the two-dimensional human body basic posture coincide respectively with a fifth preset vertex and a fifth preset boundary of the original apparel data of the leg part of the two-dimensional human body posture, or a sixth preset boundary and a sixth preset boundary center of the to-be-tried-on apparel data of the leg part of the two-dimensional human body basic posture coincide respectively with a sixth preset boundary and a sixth preset boundary center of the original apparel data of the leg part of the two-dimensional human body posture ——1301 stretching or rebounding the to-be-tried-on apparel data of the leg part of the two-dimensional human body basic posture in an extension direction of the leg part of the two-dimensional human body posture based on a tension of the cloth physical property of the original apparel and a tension of the cloth physical property of the to-be-tried-on apparel, so as to form a leg part containing the to-be-tried-on apparel data that has been stretched or rebounded ——1401

FIG. 14

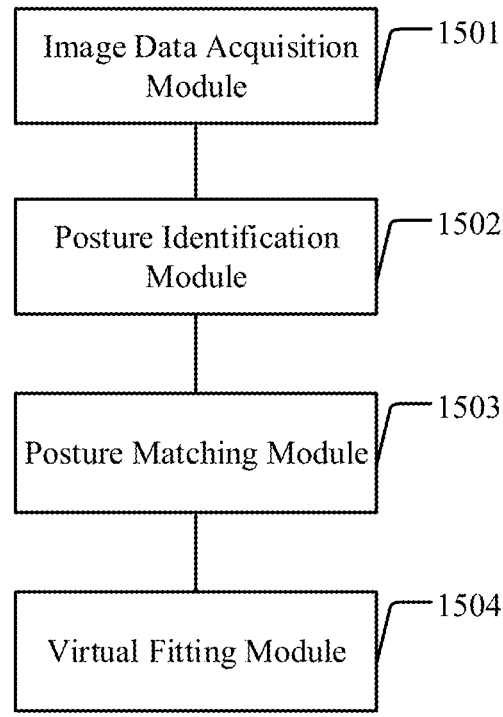

FIG. 15

APPAREL FITTING SIMULATION BASED UPON A CAPTURED TWO-DIMENSIONAL HUMAN BODY POSTURE IMAGE

CROSS-REFERENCE TO RELATED APPLICATION

This application claims priority to Chinese Patent Application No. 201910827228.0, filed Sep. 3, 2019, entitled "VIRTUAL TRY-ON METHOD AND APPARATUS, COMPUTER DEVICE AND COMPUTER-READABLE STORAGE MEDIUM", which is hereby incorporated by reference in its entirety.

TECHNICAL FIELD

The present disclosure relates to the technical field of computer technology, and in particular to a method and apparatus for processing data, a computer device and computer-readable storage medium.

BACKGROUND

This section is intended to provide a background or context to the embodiments of the disclosure recited in the claims. The description herein is not admitted to be prior art by inclusion in this section.

With the development of computer technology, a virtual garment fitting technology has gradually attracted attention and recognition of many consumers. Virtual garment fitting refers to an act of trying on virtual clothes on an avatar identical to oneself in a virtual space. A consumer can achieve the effect of wearing a certain piece of clothing through virtual garment fitting without actually changing clothes. The emergence of virtual garment fitting technology provides users with a convenient and fast fitting experience, which results in greatly changes on traditional fitting modes.

However, the conventional virtual fitting needs to collect 3D human body data to construct a 3D human body model, and construct a 3D apparel model to fuse the 3D apparel model with the 3D human body model to realize 3D fitting. However, the construction of the 3D human body model and the construction of the 3D apparel model both consume a lot of computer resources with extremely low efficiency, which is not conducive to the constructions of 3D human body models and 3D apparel models in batches. Therefore, users need to consume a long time to perform virtual fitting, which leads to low efficiency of virtual fitting and also seriously reduces the users' experiences of virtual fitting.

Therefore, the conventional virtual fitting has the disadvantages of low efficiency due to 3D modeling, and poor user experience.

SUMMARY OF THE DISCLOSURE

An embodiment of the present disclosure provides a method for processing data, so as to improve the efficiency of virtual fitting and user experience. The method includes:
  acquiring image data including a fitted human body by an image acquisition device, the image data of the fitted human body reflecting projection data of a three-dimensional human body on a first plane perpendicular to a center line of a visual field of the image acquisition device;
  identifying a two-dimensional human body posture of the fitted human body based on the image data, the two-dimensional human body posture reflecting projection data of the three-dimensional human body on a second plane, the second plane being a symmetrical plane between a front side and a rear side of the fitted human body;
  matching the identified two-dimensional human body posture to a human body posture database to determine preset human body parts of the two-dimensional human body posture; and assigning a cloth physical property of to-be-tried-on apparel to a part of the preset human body parts of the two-dimensional human body posture covered by original apparel.

An embodiment of the present disclosure provides an apparatus for processing data, applicable to improving the efficiency of virtual fitting. The apparatus comprises:
  an image data acquisition module configured to acquire image data including a fitted human body by an image acquisition device, the image data of the fitted human body reflecting projection data of a three-dimensional human body on a first plane perpendicular to a center line of a visual field of the image acquisition device;
  a posture identification module configured to identify a two-dimensional human body posture of the fitted human body based on the image data, the two-dimensional human body posture reflecting projection data of the three-dimensional human body on a second plane, the second plane being a symmetrical plane between a front side and a rear side of the fitted human body;
  a posture matching module configured to match the identified two-dimensional human body posture to a human body posture database to determine preset human body parts of the two-dimensional human body posture; and
  a virtual fitting module configured to assign a cloth physical property of to-be-tried-on apparel to a part of the preset human body parts of the two-dimensional human body posture covered by original apparel.

An embodiment of the present disclosure provides a computer device comprising a memory, a processor, and a computer program stored in the memory and executable on the processor, wherein the processor is configured to execute the computer program to implement the method for processing data as described above.

An embodiment of the present disclosure provides a computer-readable storage medium storing a computer program for implementing the method for processing data as described above.

In the embodiment of the present disclosure, image data including the fitted human body are acquired by an image acquisition device, a two-dimensional human body posture of the fitted human body is identified based on the image data, the two-dimensional human body posture is matched to a human body posture database to determine preset body parts of the two-dimensional human body posture, and a cloth physical property of to-be-tried-on apparel is assigned to a part of the preset human body parts of the two-dimensional human body posture covered by original apparel. In the embodiment of the present disclosure, there is no need to construct a three-dimensional human body model or an apparel model, and it is only needed to identify the two-dimensional human body posture of the fitted human body, and the part of the preset body parts of the two-dimensional human body posture covered by original apparel is directly assigned with the cloth physical property of to-be-tried-on apparel, thereby greatly improving the efficiency of data processing and improving user experiences.

BRIEF DESCRIPTION OF THE DRAWINGS

For clearer illustration of technical features in the embodiments of the present disclosure, a brief description of the drawings for the embodiments will be given below. Obviously, the drawings described below involve only some embodiments of this disclosure. For those of ordinary skill in the art, other drawings can be derived from these drawings without any inventive efforts. In the drawings:

FIG. 7 is flow chart of an implementation of step 504 of the method for processing data provided by an embodiment of the present disclosure;

FIG. 9 (b) is a schematic diagram of overwriting the original apparel data by the to-be-tried-on apparel data of the trunk part provided by another embodiment of the present disclosure;

FIG. 10 is a flow chart of another implementation of step 504 of the method for processing data provided by an embodiment of the present disclosure;

FIG. 12 is a schematic diagram of stretching and rebounding of the to-be-tried-on apparel data of the trunk part provided by an embodiment of the present disclosure;

FIG. 13 is a flow chart of a further implementation of step 504 of the method for processing data provided by an embodiment of the present disclosure;

FIG. 14 is a flow chart of still another implementation of step 504 of the method for processing data provided by an embodiment of the present disclosure;

FIG. 15 is a diagram of functional modules of an apparatus for processing data provided by an embodiment of the present disclosure;

DETAILED DESCRIPTION OF THE DISCLOSURE

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

Figure 1:
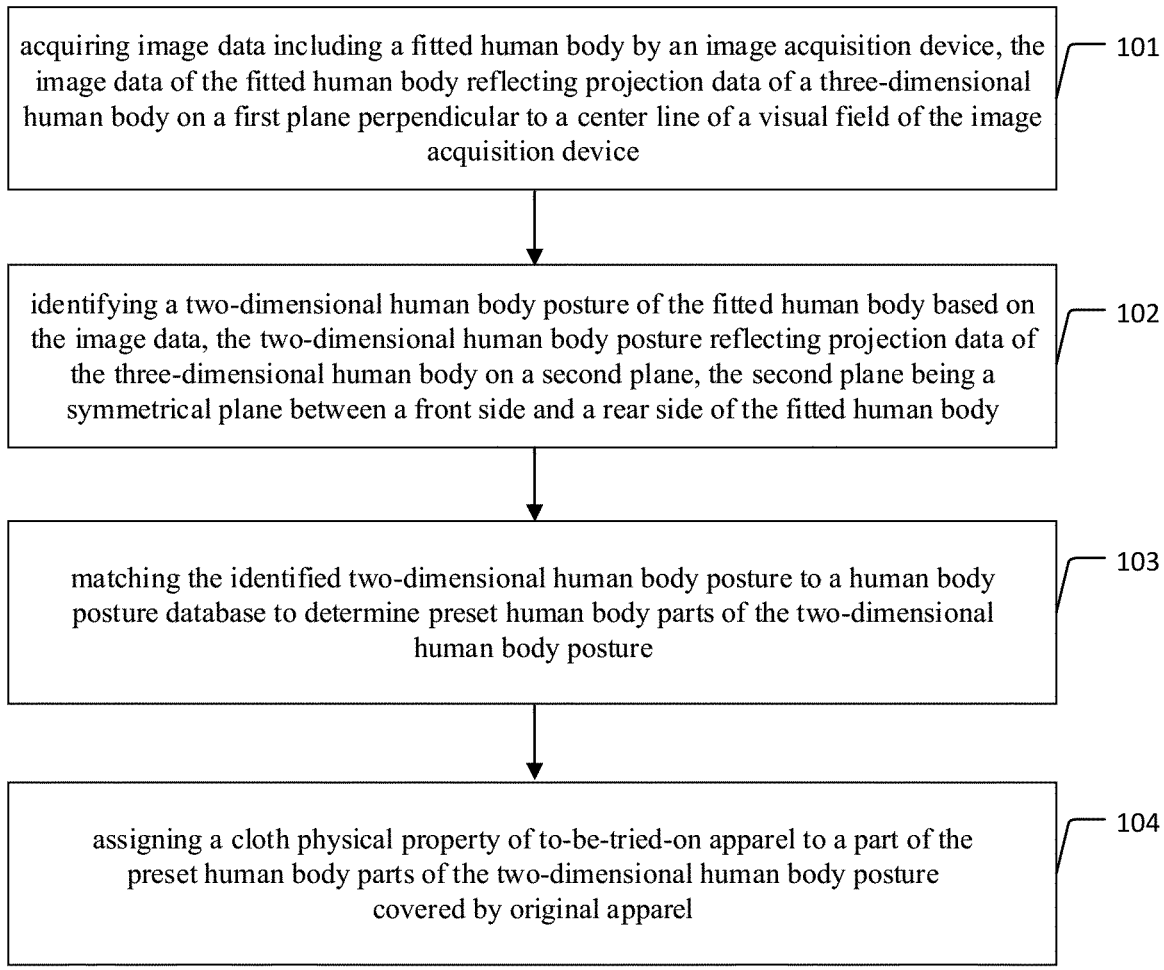
FIG. 1 is a flow chart of an implementation of the method for processing data provided by an embodiment of the present disclosure.

FIG. 1 shows an implementation of the method for processing data provided by an embodiment of the present disclosure. For the convenience of description, only the parts related to the embodiment of the present disclosure are shown, which shall be described below in details.

As shown in FIG. 1, the method for processing data includes:

step 101: acquiring image data including a fitted human body by an image acquisition device, the image data of the fitted human body reflecting projection data of a three-dimensional human body on a first plane perpendicular to a center line of a visual field of the image acquisition device;

step 102: identifying a two-dimensional human body posture of the fitted human body based on the image data, the two-dimensional human body posture reflecting projection data of the three-dimensional human body on a second plane, the second plane being a symmetrical plane between a front side and a rear side of the fitted human body;

step 103: matching the identified two-dimensional human body posture to a human body posture database to determine preset body parts of the two-dimensional human body posture; and step 104: assigning a cloth physical property of to-be-tried-on apparel to a part of the preset body parts of the two-dimensional human body posture covered by original apparel.

In the embodiment of the present disclosure, the image acquisition device may be, for example, a common camera capable of acquiring a single-frame image, or depth camera, etc., or may be a video camera capable of acquiring video images, or the like. Correspondingly, the image data may include RGB data, and may also include RGBD data, which includes RGB data and depth data of a distance between the fitted human body and a depth camera. That is, in step 101, acquiring image data including the fitted human body by the image acquisition device includes: acquiring RGB data including the fitted human body by a camera, or acquiring RGBD data including the fitted human body by a depth camera.

In addition, when the image acquisition device is a video camera, a video image captured by the video camera may be converted into a single-frame image, and then each frame of image including the fitted human body may be acquired.

The fitted human body may be a person wearing clothes, an apparel display stand, or an item resembling human body such as a human skeleton or a clothes hanger, which is not particularly limited in the embodiment of the present disclosure.

Figure 2:
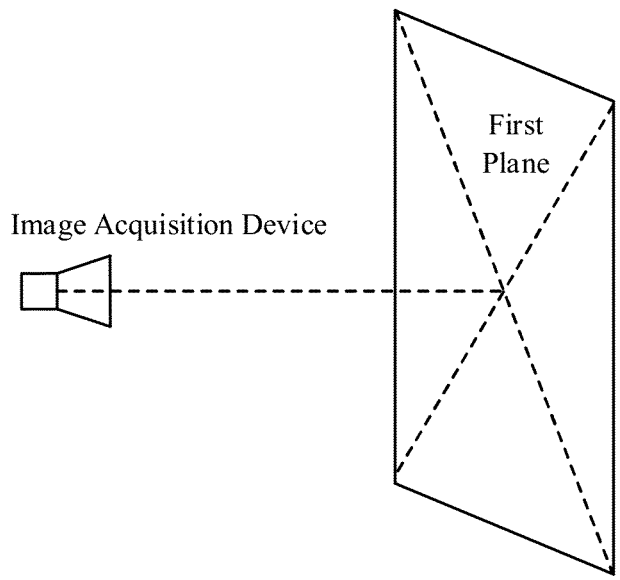
FIG. 2 is a schematic diagram (side view) of positions of an image acquisition device and a first plane provided by an embodiment of the present disclosure.

FIG. 2 is a schematic diagram (side view) of positions of the image acquisition device and a first plane provided by an embodiment of the present disclosure. For convenience of description, only the parts related to the embodiment of the present disclosure are shown, which shall be described below in details.

As shown in FIG. 2, the first plane is perpendicular to a center line of a visual field of the image acquisition device. Preferably, the image acquisition device is located in a middle area near the top of a virtual fitting terminal, and the virtual fitting terminal may include, for example, an intelligent virtual fitting mirror, or other fitting terminals including display screens. The first plane is parallel to a plane where the virtual fitting terminal is located, and the front of the fitted human body faces the virtual fitting terminal. The image data including the fitted human body obtained by the image acquisition device reflects a projection of the three-dimensional human body on the first plane.

Figure 3:
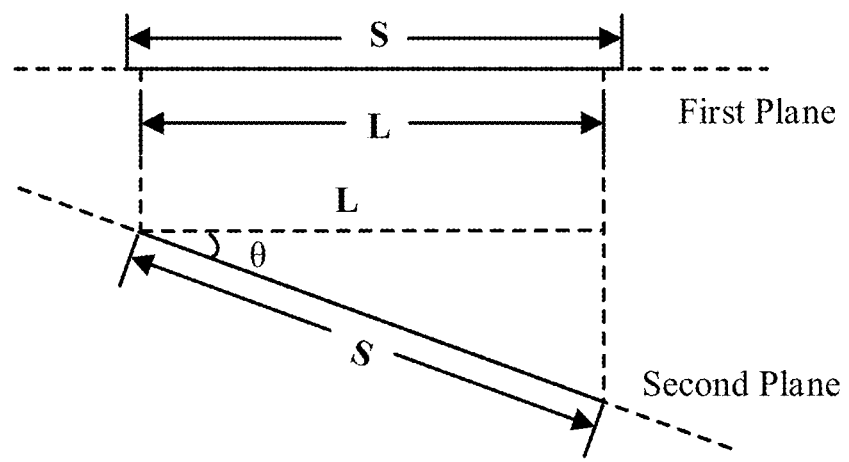
FIG. 3 is a schematic diagram (top view) of positions of the first plane and a second plane provided by an embodiment of the present disclosure.
Figure 4:
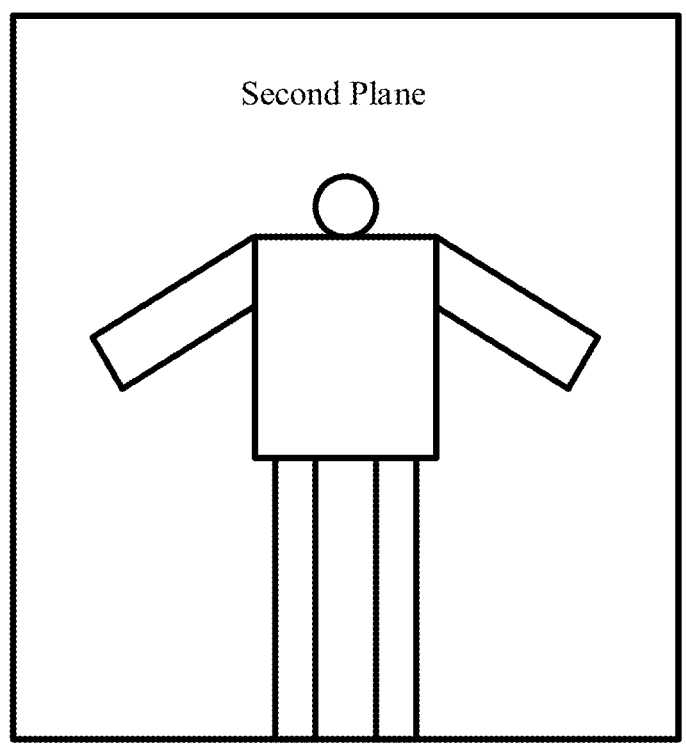
FIG. 4 is a schematic diagram of a two-dimensional human body posture provided by an embodiment of the present disclosure (a center line of a visual field is perpendicular to the second plane)

FIG. 3 is a schematic diagram (top view) of positions of the first plane and the second plane provided by an embodiment of the present disclosure, and FIG. 4 is a schematic diagram of the two-dimensional human body posture provided by an embodiment of the present disclosure (the center line of the visual field is perpendicular to the second plane). For the convenience of description, only the parts related to the embodiment of the present disclosure are shown, which shall be described below in details.

As shown in FIG. 3 and FIG. 4, FIG. 3 shows viewing in a viewing angle from a top view, and a width of the projection of the three-dimensional human body on the second plane is S; and FIG. 4 shows viewing in a viewing angle that a center line of the visual field is perpendicular to the second plane, and the projection of the three-dimensional human body on the second plane is the two-dimensional human body posture shown in FIG. 4.

The first plane and the second plane may be parallel planes or the same plane, or may be different planes. When the first plane and the second plane are parallel to each other, the projection of the three-dimensional human body on the second plane is consistent with the projection of the three-dimensional human body on the first plane. In other words, the size and posture of the projection of the three-dimensional human body on the second plane completely coincide with that of the projection of the three-dimensional human body on the first plane. When the first plane and the second plane are the same plane, the projection of the three-dimensional human body on the second plane is the projection of the three-dimensional human body on the first plane.

In most cases, as shown in FIG. 3, the first plane and the second plane are not parallel to each other, or are not the same plane. In this case, there exists an angle θ between the first plane and the second plane, that is, the fitted human body stands obliquely in front of the virtual fitting terminal. So the image data of the fitted human body obtained by the image acquisition device is data of the projection of the three-dimensional human body on the first plane, and the width of the data of the projection is L. The following formula may be obtained based on a geometry principle:

$$\cos(\theta) = \frac{L}{S}$$

Furthermore, the data of the projection of the fitted human body on the second plane may be determined based on the geometric relationship and the data of the projection of the fitted human body on the first plane, so as to identify the two-dimensional human body posture of the fitted human body on the second plane.

After obtaining the image data of the fitted human body, the two-dimensional human body posture of the fitted human body is identified based on the obtained image data. Preferably, when the acquired image data is RGBD data including RGB data and depth data of a distance between the fitted human body and a depth camera, the two-dimensional human body posture of the fitted human body may be identified by the following steps.

Firstly, depth values in current RGBD image data are extracted, and pixels corresponding to near positions and similar RGBD depth values are clustered and combined.

Furthermore, a human body posture database is invoked to perform a human figure detection on the above combination of pixels. Specifically, the combination of pixels is matched to different human body posture models in the human body posture database one by one (starting from a T-posture basic human body model), and a human body posture in the human body posture database that is similar to the combination of pixels is selected. If the combination of pixels has a low similarity or dissimilarity with the human body postures in the human body posture database, a preset similarity standard of the near positions and similar depth values of pixels in the RGBD image is lowered, the pixels in the image are clustered and combined again, and the new combination of pixels is matched to different human body posture models in the human body posture database one by one (starting from the T-posture basic human body model); performing the above steps iteratively until the similarity between the current combination of pixels in the RGBD image and a certain human body posture model in the human body posture database is not less than a preset similarity, and the certain human body posture model in the human body posture database is determined as the human body posture of the current fitted human body.

Next, joint and skeleton lines are outlined on the determined human body posture model (parallel to the second plane), so as to make the human body posture model being an objective human body marker like "matchmen". Then joint points are calibrated on the human body posture model, and a human body boundary range is delimited on the human body posture model, so as to obtain a two-dimensional human body posture of the fitted human body containing position information of skeleton points, i.e. the data of the projection of the three-dimensional human body posture on the second plane.

Preferably, when the acquired image data is RGB data, the two-dimensional human body posture of the fitted human body is identified by the following steps.

Firstly, the current RGB image data is extracted, and pixels corresponding to near positions and similar colors are clustered and combined. Furthermore, an approximate position of the human body is determined with a face recognition technology. Then, a human body posture database is invoked to perform a human figure detection on the above combination of pixels. Specifically, the combination of pixels is matched to different human body posture models in the human body posture database one by one (starting from a T-posture basic human body model), and a human body posture in the human body posture database that is similar to the combination of pixels is selected. If the combination of pixels has a low similarity or dissimilarity with the human body postures in the human body posture database, a preset similarity standard of the near positions and similar colors in the RGB image is lowered, the pixels in the image are clustered and combined again, and the new combination of pixels is matched to different human body posture models in the human body posture database one by one again (starting from the T-posture basic human body model); performing the above steps iteratively until the similarity between the current combination of pixels in the RGB image and a certain human body posture model in the human body posture database is not less than a preset similarity, and the certain human body posture model in the human body posture database is determined as the human body posture of the current fitted human body.

Next, joint and skeleton lines are outlined on the determined human body posture model (parallel to the second plane), so as to make the human body posture model being an objective human body marker like "matchmen". Then joint points are calibrated on the human body posture model, and a human body boundary range is delimited on the human body posture model, so as to obtain a two-dimensional human body posture of the fitted human body containing position information of skeleton points, i.e. the data of the projection of the three-dimensional human body posture on the second plane.

In summary, the two-dimensional human body posture of the fitted human body is the data of the projection of the three-dimensional human body on the second plane. When defining the second plane, the human body may be approximately regarded as a symmetrical structure, and the second plane is defined as a symmetry plane between the front and the back of the human body. Therefore, in the embodiment of the present disclosure, it is not necessary to construct a three-dimensional human body model or a three-dimensional apparel model. It is only necessary to obtain the two-dimensional human body posture of the three-dimensional human body on the plane, so as to use the two-dimensional human body posture to perform virtual fitting, thereby significantly improving the efficiency of the virtual fitting and improving users' experiences.

Human body posture identification is capable of identifying the boundary range of the two-dimensional human posture in the image data, that is, delimiting the boundary range of the human body. However, the human body posture identification is unable to identify postures of various parts of the human body, such as the head, arms, torso, and legs. In view of this, on the basis of identifying the two-dimensional human body posture, the two-dimensional human body posture is matched to the human body posture database to determine a posture of a preset human body part of the two-dimensional human body posture, so as to improve accuracy and authenticity of virtual fitting.

The preset human body part is a human body part set in advance. It may be understood by those skilled in the art that the preset human body part may include one or more of the head, the arms, the torso and the legs. For example, the preset human body part may only include the arms and the torso when performing a virtual fitting of a coat. For another example, the preset human body part may only include the legs when performing a virtual fitting of trousers or a skirt. The preset human body part is not particularly limited in the embodiment of the present disclosure.

In addition, the human body posture database may be obtained by training in advance by using a deep-learning framework, such as TensorFlow. The human body posture database obtained by the training contains a large number or even massive different two-dimensional human body postures. TensorFlow is a second-generation artificial intelligence learning system developed by Google, in which complex data structures are transmitted to an artificial intelligence neural network for analysis and processing. TensorFlow may be used in many machine-learning and deep-learning fields, such as speech recognition and image recognition, and may support convolutional neural networks, recurrent neural networks, and long short-term memory networks, etc.

Next, the identified two-dimensional human body posture of the fitted human body is matched to the human body posture database to determine dataset and posture of each preset human body part of the two-dimensional human body posture. Preferably, it may be achieved by the following method.

Firstly, skeleton point positions of each preset human body part of the two-dimensional human body posture may be identified while identifying the two-dimensional human body posture. Then dataset of each preset human body part in the two-dimensional human posture may be determined with reference to boundary data of the two-dimensional human body posture, such as a dataset of the head, a dataset of the trunk, and a dataset of the legs, etc.

Furthermore, in order to improve the accuracy of posture identification of each preset human body part of the two-dimensional human body posture, data of each preset human body part are combined and clustered respectively, wherein data with similar colors are combined to further determine detailed parts of each preset human body part, such as the upper arm, the lower arm, elbow joints, finger joints, and other detailed parts of the arms part; and knee joints, thighs, calves, and other detailed parts of the legs part.

In addition, in order to further improve the accuracy of posture identification of each preset human body part of the two-dimensional human body posture, rotation and conversion are performed on an orientation and angle of the two-dimensional human body posture in the human body posture database which are different from an orientation and angle of the identified two-dimensional human body posture. In other words, the two-dimensional human body posture in the human body posture database is adjusted to a position where the orientation and angle are basically consistent with that of the identified two-dimensional human body posture, and then the matching is performed.

For convenience of description, it is assumed that the two-dimensional human body posture is denoted by A0. After determining the dataset of each preset human body part of the two-dimensional human body posture, the dataset of each preset human body part of the two-dimensional human body posture A0 is matched to the two-dimensional human body postures in the human body posture database. When similarities between the datasets of the preset human body parts of the two-dimensional human body posture A0 and the preset human body parts of a two-dimensional human body posture A1 in the human body posture database are all not smaller than a preset similarity, the two-dimensional human body posture A1 in the human body posture database is determined as a matched two-dimensional human body posture. Then the posture of each preset human body part of the two-dimensional human body posture A0 is determined based on the posture of each preset human body part of the two-dimensional human body posture A1 in the human body posture database.

After the dataset and posture of each preset human body part of the two-dimensional human body posture are determined, a portion of each human body part, which is covered by the original apparel, is assigned a cloth physical property of to-be-tried-on apparel, so as to perform the operation of virtual fitting.

The cloth physical property refers to a variable maximum distance (a stretching scale) and a minimum distance (a rebounding scale) between two adjacent pixels in the cloth image. The cloth physical properties of to-be-tried-on apparel and the original apparel worn by the fitted human body are known pre-prepared data. Assigning the cloth physical property of apparel may be performed, for example, by receiving an instruction of a user. For example, the user inputs an instruction by clicking. For another example, the user encodes the cloth physical property of apparel in advance, so that the instruction can be input by entering the number of the cloth physical property of apparel).

In addition, the cloth physical property of apparel may also be obtained by a high-definition camera, and the cloth physical properties of all apparel may be formed into a cloth physical property database. The resolution of the high-definition camera is, for example, but not limited to, 460× 320 to 4 k, 8 k, and 16 k, etc. The maximum resolution is determined by hardware. The cloth physical property of the apparel may also be obtained through machine learning, and the cloth physical properties of all apparel are formed into a cloth physical property database. When assigning the physical property of apparel, the cloth physical property of to-be-tried-on apparel may be determined from the cloth physical property database.

In the embodiment of the present disclosure, the image data including the fitted human body is acquired by the image acquisition device; then the two-dimensional human body posture of the fitted human body is identified based on the image data, and the two-dimensional human body posture is matched to the human body posture database to determine the preset human body parts of the two-dimensional human body posture; and finally the cloth physical property of to-be-tried-on apparel is assigned to the portion of each preset body part of the two-dimensional human body posture covered by original apparel. In the embodiment of the present disclosure, there is no need to construct a three-dimensional human body model or an apparel model. It is only necessary to identify the two-dimensional human body posture of the fitted human body, and the portion of each preset body part of the two-dimensional human body posture covered by original apparel is directly assigned with the cloth physical property of to-be-tried-on apparel, thereby significantly improving the efficiency of virtual fitting and improving user experiences.

Figure 5:
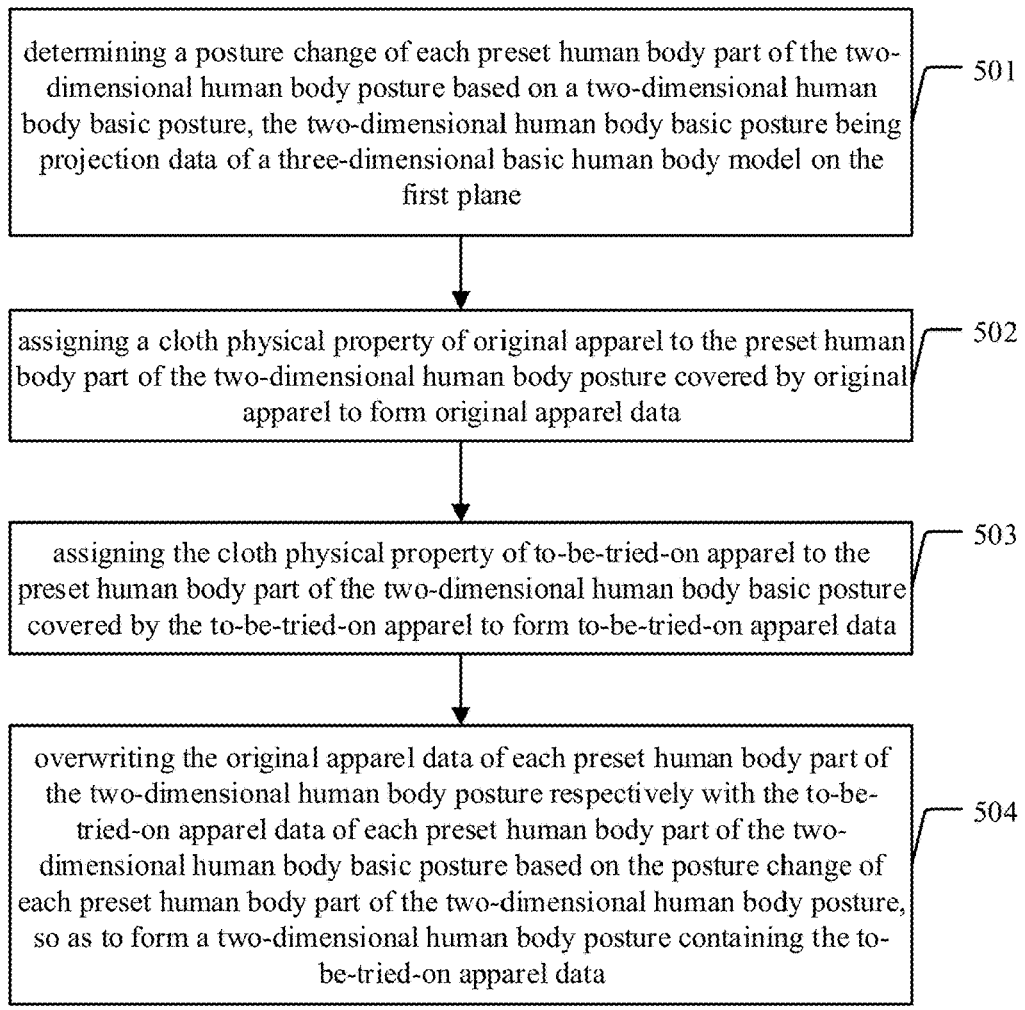
FIG. 5 is flow chart of another implementation of the method for processing data provided by an embodiment of the present disclosure.

FIG. 5 is flow chart of another implementation of the method for processing data provided by an embodiment of the present disclosure. For the convenience of description, only the parts related to the embodiment of the present disclosure are shown, which shall be described below in details.

In an embodiment of the present disclosure, as shown in FIG. 5, on the basis of the steps of the method shown in FIG. 1, the method for processing data further includes:

step 501: determining posture change of each preset human body part of the two-dimensional human body posture based on a two-dimensional human body basic posture, the two-dimensional human body basic posture being projection data of a three-dimensional basic human body model on the first plane;

step 502: assigning a cloth physical property of original apparel to a preset human body part of the two-dimensional human body posture covered by original apparel to form original apparel data;

step 503: assigning a cloth physical property of to-be-tried-on apparel to a preset human body part of the two-dimensional human body basic posture covered by the to-be-tried-on apparel to form to-be-tried-on apparel data; and step 504: overwriting the original apparel data of each preset human body part of the two-dimensional human body posture by the to-be-tried-on apparel data of each preset human body part of the two-dimensional human body basic posture based on the posture change of each preset human body part of the two-dimensional human body posture, so as to form a two-dimensional human body posture containing the to-be-tried-on apparel data.

In the embodiment of the present disclosure, there exists a three-dimensional basic human body model, which is a standard T-pose model. In the standard T-pose three-dimensional basic human body model, the arms are raised to be in a state perpendicular to the shoulders, which is named as a T-pose model as it resembles a T-shape. The two-dimensional human body basic posture is projection data of the T-pose three-dimensional basic human body model on the first plane.

Figure 6:
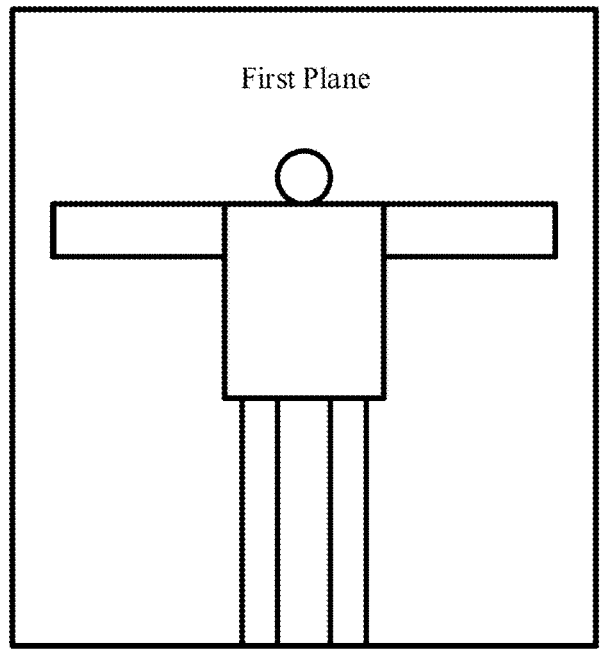
FIG. 6 is a schematic diagram of a two-dimensional human body basic posture provided by an embodiment of the present disclosure (the center line of the visual field is perpendicular to the first plane)

FIG. 6 is a schematic diagram of the two-dimensional human body basic posture provided by an embodiment of the present disclosure, wherein the center line of the visual field is perpendicular to the first plane. For the convenience of description, only the parts related to the embodiment of the present disclosure are shown, which shall be described below in details.

The human body posture shown in FIG. 6 is the projection data of the T-pose three-dimensional basic human body model on the first plane, that is, the two-dimensional human body basic posture.

In order to improve authenticity of the virtual fitting, posture change of each preset human body part of the two-dimensional human body posture shown in FIG. 4 may be firstly determined based on the two-dimensional human body basic posture, so as to serve as a foundation for subsequent overwriting of cloth physical property and virtual fitting.

In view of the fact that the authenticity of the virtual fitting will be reduced if each preset human body part of the two-dimensional human body posture covered by the original apparel is directly assigned the cloth physical property of to-be-tried-on apparel. In order to improve the authenticity of the virtual fitting, the cloth physical property of original apparel may be overwritten by the cloth physical property of to-be-tried-on apparel.

Specifically, the preset human body part of the two-dimensional human body posture covered by the original apparel are directly assigned the cloth physical property of original apparel to form the original apparel data. The preset human body part of the two-dimensional human body basic posture covered by the to-be-tried-on apparel is assigned the cloth physical property of to-be-tried-on apparel to form the to-be-tried-on apparel data.

After the original apparel data of the two-dimensional human body posture and the to-be-tried-on apparel data of the two-dimensional human body basic posture are determined, for example, the posture of each preset human body part of the two-dimensional human body basic posture is adjusted to a state consistent with the posture of each preset human body part of the two-dimensional human body posture based on posture change of each preset human body part of the two-dimensional human body posture, and the original apparel data of each preset human body part of the two-dimensional human body posture is overwritten by the to-be-tried-on apparel data of each preset human body part of the two-dimensional human body basic posture, that is, overwriting operations are performed respectively on different human body parts to form the two-dimensional human body posture containing the to-be-tried-on apparel data, so as to complete the operation of virtual fitting.

In the embodiment of the present disclosure, the posture change of each preset human body part of the two-dimensional human body posture is determined based on the two-dimensional human body basic posture; the preset human body part of the two-dimensional human body posture covered by the original apparel is assigned the cloth physical property of the original apparel to form the original apparel data; the preset human body part of the two-dimensional human body basic posture covered by the to-be-tried-on apparel is assigned the cloth physical property of to-be-tried-on apparel to form the to-be-tried-on apparel data; and furthermore, the original apparel data of each preset human body part of the two-dimensional human body posture is overwritten by the to-be-tried-on apparel data of each preset human body part of the two-dimensional human body basic posture based on the posture change of each preset human body part of the two-dimensional human body posture, thereby improving the authenticity of the virtual fitting.

FIG. 7 is flow chart of an implementation of step 504 in the method for processing data provided by an embodiment of the present disclosure. For the convenience of description, only the parts related to the embodiment of the present disclosure are shown, which shall be described below in details.

In an embodiment of the present disclosure, the preset body parts include the arms and the trunk. As shown in FIG. 7, in step 504, overwriting the original apparel data of each preset human body part of the two-dimensional human body posture with the to-be-tried-on apparel data of each preset human body part of the two-dimensional human body basic posture based on the posture change of each preset human body part of the two-dimensional human body posture, so as to form the two-dimensional human posture containing the to-be-tried-on apparel data, comprises:

step 701: overwriting original apparel data of an arm part of the two-dimensional human body posture with to-be-tried-on apparel data of an arm part of the two-dimensional human body basic posture based on a posture change of the arm part of the two-dimensional human body posture, so as to form an arm part containing the to-be-tried-on apparel data; wherein a first preset vertex and a first preset boundary of the to-be-tried-on apparel data of the arm part of the two-dimensional human body basic posture coincide respectively with a first preset vertex and a first preset boundary of the original apparel data of the arm part of the two-dimensional human body posture, or a second preset boundary and a second preset boundary center of the to-be-tried-on apparel data of the arm part of the two-dimensional human body basic posture coincide respectively with a second preset boundary and a second preset boundary center of the original apparel data of the arm part of the two-dimensional human body posture; and step 702: overwriting original apparel data of a trunk part of the two-dimensional human body posture with to-be-tried-on apparel data of a trunk part of the two-dimensional human body basic posture, so as to form a trunk part containing the to-be-tried-on apparel data; wherein a third preset vertex and a third preset boundary of the to-be-tried-on apparel data of the trunk part of the two-dimensional human body basic posture coincide respectively with a third preset vertex and a third preset boundary of the original apparel data of the trunk part of the two-dimensional human body posture, or a fourth preset boundary and a fourth preset boundary center of the to-be-tried-on apparel data of the trunk part of the two-dimensional human body basic posture coincide respectively with a fourth preset boundary and a fourth preset boundary center of the original apparel data of the trunk part of the two-dimensional human body posture.

In the embodiment of the present disclosure, the preset human body parts include the arms and the trunk, which is applicable to a case where the to-be-tried-on apparel is a jacket.

Figure 8:
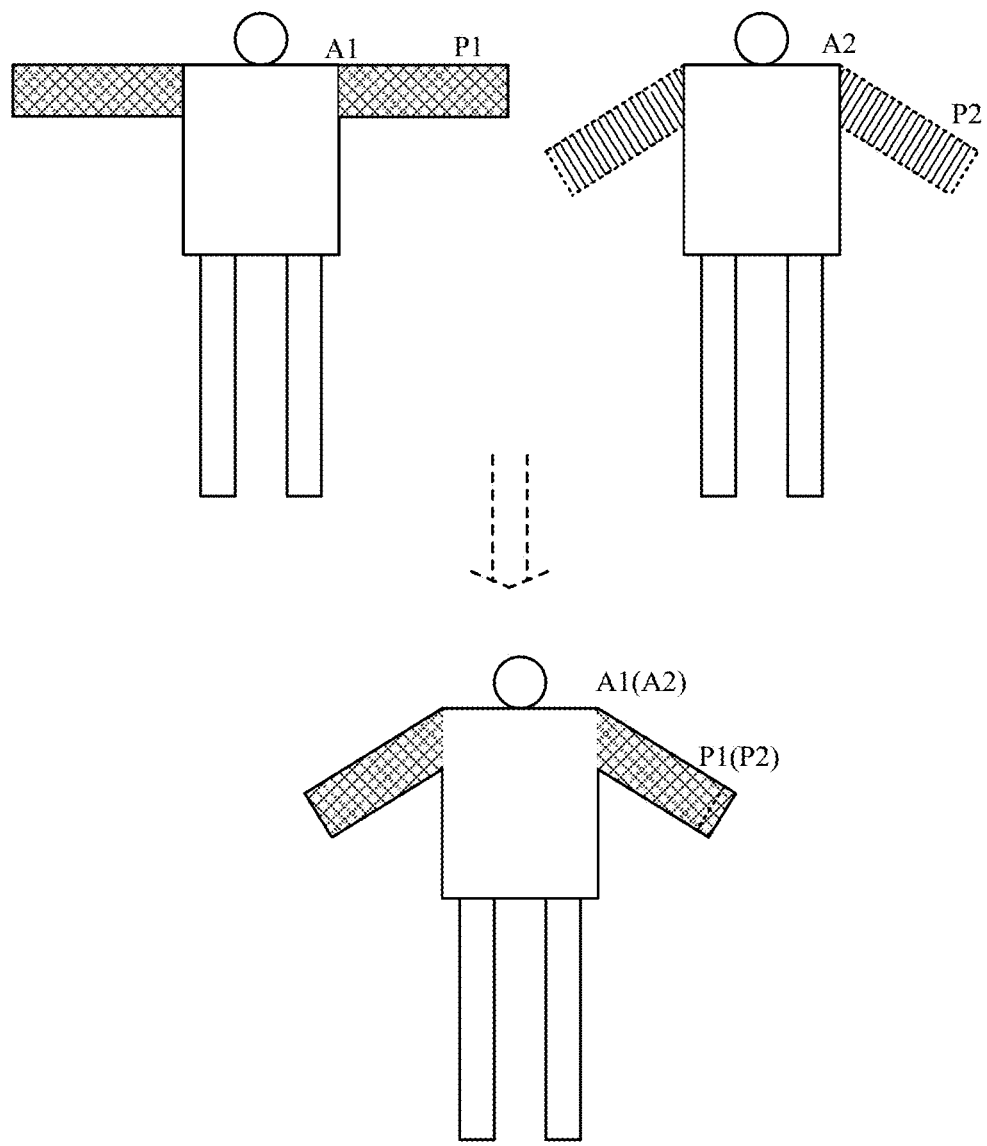
FIG. 8 is a schematic diagram of overwriting original apparel data by to-be-tried-on apparel data of an arm part provided by an embodiment of the present disclosure.

FIG. 8 is a schematic diagram of overwriting original apparel data with to-be-tried-on apparel data of an arm part provided by an embodiment of the present disclosure. For the convenience of description, only the parts related to the embodiment of the present disclosure are shown, which shall be described below in details.

As shown in FIG. 8, for the arm part, when the original apparel data is overwritten by the to-be-tried-on apparel data, a posture of the arm part of the two-dimensional human body basic posture containing the to-be-tried-on apparel data is adjusted to be consistent with a posture of the arm part of the two-dimensional human body posture containing the original apparel data based on a posture change of the arm part of the two-dimensional human body posture, and then original apparel data of the arm part is overwritten with to-be-tried-on apparel data of the arm part, so as to form the arm part containing the to-be-tried-on apparel data.

As shown in FIG. 8, the right arm part is taken as an example, and the left arm is identical thereto. The first preset vertex is an upper vertex of a contact position where the arm part is in contact with the trunk part. The first preset vertex of the to-be-tried-on apparel data of the arm part of the two-dimensional human body basic posture is A1, and the first preset vertex of the original apparel data of the arm part of the two-dimensional human body posture is A2. The first preset boundary is an upper boundary of the arm part. The first preset boundary of the to-be-tried-on apparel data of the arm part of the two-dimensional human body basic posture is P1, and the first preset boundary of the original apparel data of the arm part of the two-dimensional human body posture is P2. Specifically, when overwriting is performed, the first preset vertex A1 of the to-be-tried-on apparel data of the arm part of the two-dimensional human body basic posture coincides with the first preset vertex A2 of the original apparel data of the arm part of the two-dimensional human body posture, and the first preset boundary P1 of the to-be-tried-on apparel data of the arm part of the two-dimensional human body basic posture coincides with the first preset boundary P2 of the original apparel data of the arm part of the two-dimensional human body posture, so as to complete the overwriting. In the embodiment of the present disclosure, the overwriting is performed in a manner that the first preset vertexes coincide and the first preset boundaries coincide, thereby further improving the authenticity of the virtual fitting.

In addition, the first preset vertex may also be other vertices than the above vertexes A1 (A2), and the first preset boundary may also be other boundaries than the above boundaries P1 (P2), which are not limited in the embodiment of the present disclosure.

In the embodiment of the present disclosure, the overwriting is performed in a manner that the first preset vertex and the first preset boundary of the to-be-tried-on apparel data of the arm part coincide respectively with the first preset vertex and the first preset boundary of the original apparel data of the arm part, which may further improve the authenticity of virtual fitting.

In an embodiment of the present disclosure, the second preset boundary is the upper boundary of the arm part, which is consistent with the above first preset boundary. The second preset boundary of the to-be-tried-on apparel data of the arm part of the two-dimensional human body basic posture is P1, and the second preset boundary of the original apparel data of the arm part of the two-dimensional human body posture is P2. Specifically, when the overwriting is performed, the second preset boundary P1 of the to-be-tried-on apparel data of the arm part of the two-dimensional human body basic posture coincides with the second preset boundary P2 of the original apparel data of the arm part of the two-dimensional human body posture, and the center of the second preset boundary P1 coincides with the center of the second preset boundary P2 (not shown in the figure). In the embodiment of the present disclosure, the overwriting is performed in a manner that the second preset boundaries coincide and the centers of the second preset boundaries coincide, thereby further improving the authenticity of virtual fitting.

In addition, the second preset boundary may also be other boundaries than the above boundaries P1 (P2), which are not limited in the embodiment of the present disclosure.

In the embodiment of the present disclosure, the overwriting is performed in a manner that the second preset boundary and the center of the second preset boundary of the to-be-tried-on apparel data of the arm part coincide respectively with the second preset boundary and the center of the second preset boundary of the original apparel data of the arm part, thereby further improving the authenticity of virtual fitting.

Figure 9A:
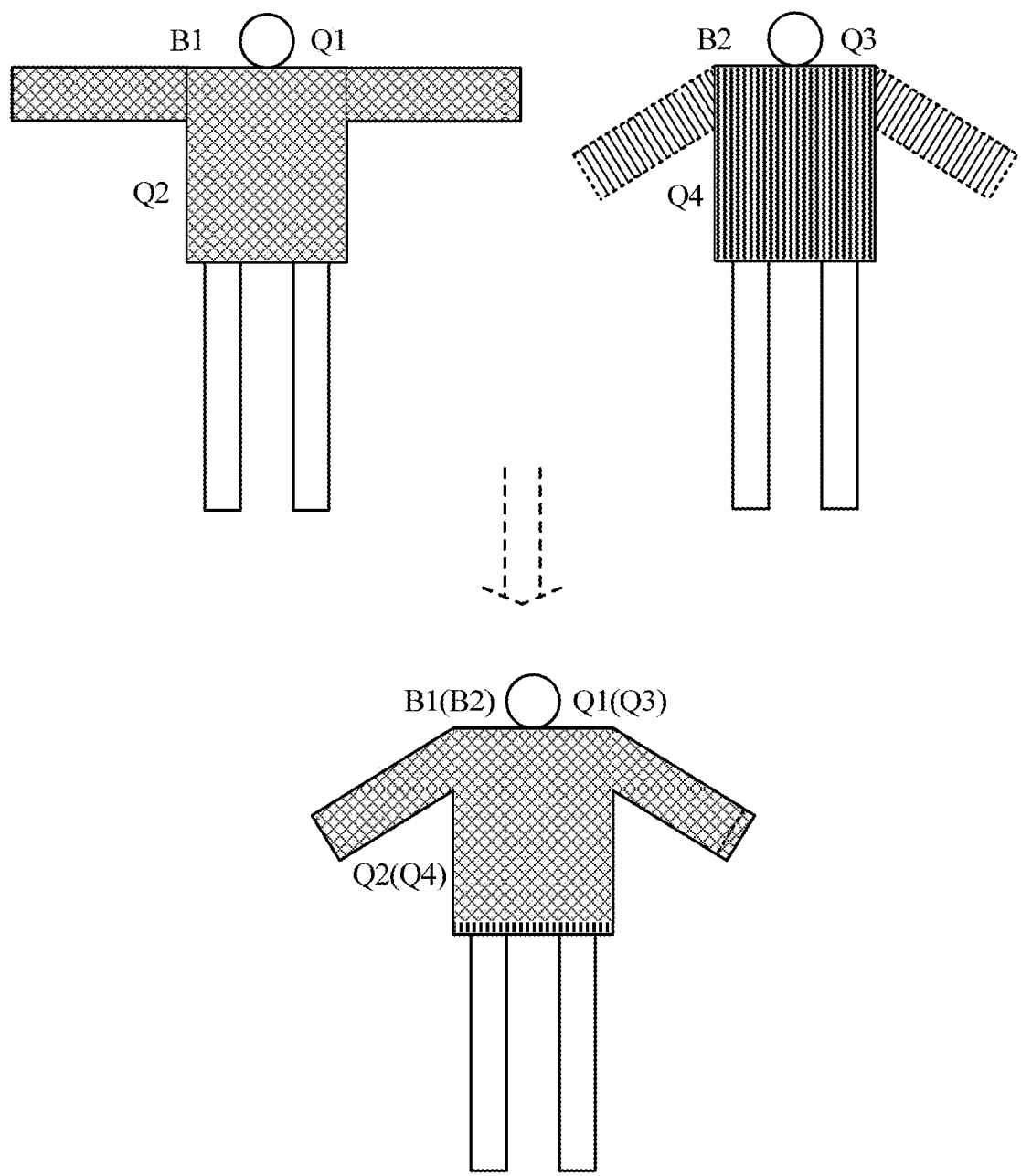
FIG. 9 (a) is a schematic diagram of overwriting original apparel data by to-be-tried-on apparel data of a trunk part provided by an embodiment of the present disclosure.
Figure 9B:
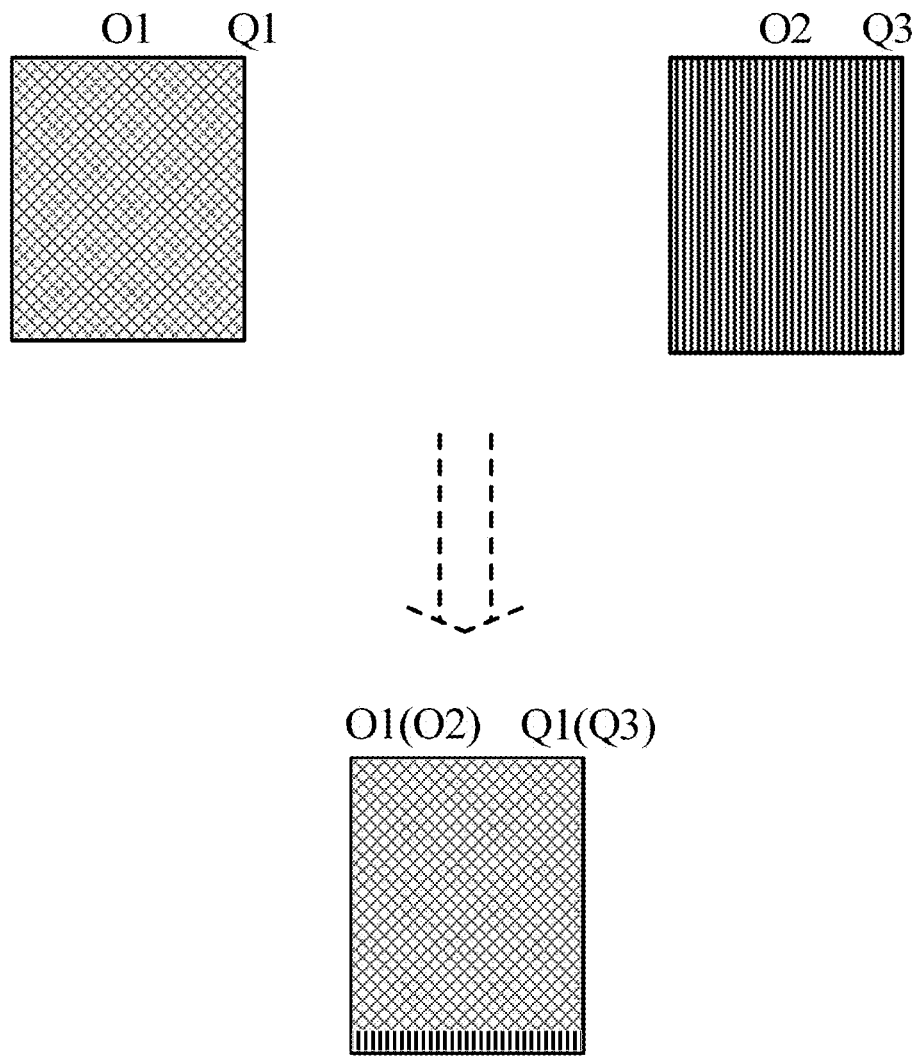

FIG. 9 (a) is a schematic diagram of overwriting the original apparel data with the to-be-tried-on apparel data of the trunk part provided by an embodiment of the present disclosure. For the convenience of description, only the parts related to the embodiment of the present disclosure are shown, which shall be described below in details.

As shown in FIG. 9(a), for the trunk part, when overwriting the original apparel data with the to-be-tried-on apparel data, as the posture of the trunk part is basically unchanged on a two-dimensional plane, the trunk part on the two-dimensional plane may be approximately viewed as a square. Therefore, the to-be-tried-on apparel data of the trunk part may directly overwrite the original apparel data of the trunk part, thereby forming the trunk part containing the to-be-tried-on apparel data.

As shown in FIG. 9 (a), the third preset vertex may be an upper vertex of a contact position where the trunk part is in contact with the arm part. The third preset vertex of the to-be-tried-on apparel data of the trunk part of the two-dimensional human body basic posture is B1, which in this embodiment is substantially consistent with the vertex A1. The third preset vertex of the original apparel data of the trunk part of the two-dimensional human body posture is B2. The third preset boundary includes an upper boundary and a left boundary of the trunk part. The third preset boundary of the to-be-tried-on apparel data of the trunk part of the two-dimensional human body basic posture includes an upper boundary Q1 and a left boundary Q2. The third preset boundary of the original apparel data of the trunk part of the two-dimensional human body posture includes an upper boundary Q3 and a left boundary Q4. Specifically, when the overwriting is performed, the third preset vertex B1 of the to-be-tried-on apparel data of the trunk part of the two-dimensional human body basic posture coincides with the third preset vertex B2 of the original apparel data of the trunk part of the two-dimensional human body posture, the upper boundary Q1 of the to-be-tried-on apparel data of the trunk part of the two-dimensional human body basic posture coincides with the upper boundary Q3 of the original apparel data of the trunk part of the two-dimensional human body posture, and the left boundary Q2 of the to-be-tried-on apparel data of the trunk part of the two-dimensional human body basic posture coincides with the left boundary Q4 of the original apparel data of the trunk part of the two-dimensional human body posture, so as to complete the overwriting. In the embodiment of the present disclosure, the overwriting is performed in a manner that the third preset vertexes of the trunk part coincide and the third preset boundaries coincide, thereby further improving the authenticity of the virtual fitting.

In addition, the third preset vertex may also be other vertexes than the above vertexes B1 (B2), such as an upper vertex of a contact position where the trunk part is in contact with the right arm; and the third preset boundary may also be other boundaries than the above boundaries Q1 and Q2 (Q3 and Q4), such as an upper boundary and a right boundary of the trunk part, which is not limited in this embodiment of the present disclosure.

In the embodiment of the present disclosure, the overwriting is performed in a manner that the third preset vertex and the third preset boundary of the to-be-tried-on apparel data of the trunk part of the two-dimensional human body basic posture coincide respectively with the third preset vertex and the third preset boundary of the original apparel data of the trunk part of the two-dimensional human body posture, thereby further improving the authenticity of virtual fitting.

FIG. 9 (b) is another schematic diagram of overwriting the original apparel data with the to-be-tried-on apparel data of the trunk part provided by an embodiment of the present disclosure. For the convenience of description, only the parts related to the embodiment of the present disclosure are shown, which shall be described below in details.

As shown in FIG. 9 (b), in an embodiment of the present disclosure, the fourth preset boundary is an upper boundary of the trunk part, which is consistent with the third preset boundary in the above embodiment. The fourth preset boundary of the to-be-tried-on apparel data of the trunk part of the two-dimensional human body basic posture is Q1, and a center of the fourth preset boundary Q1 is O1; the fourth preset boundary of the original apparel data of the trunk part of the two-dimensional human body posture is Q3, and a center of the fourth preset boundary Q3 is O2. When the overwriting is performed, the fourth preset boundary Q1 of the to-be-tried-on apparel data of the trunk part of the two-dimensional human body basic posture coincides with the fourth preset boundary Q3 of the original apparel data of the trunk part of the two-dimensional human body posture, and the center O1 of the fourth preset boundary Q1 coincides with the center O2 of the fourth preset boundary Q3. In the embodiment of the present disclosure, the overwriting is performed in a manner that the fourth preset boundaries coincide and the centers of the fourth preset boundaries coincide, thereby further improving the authenticity of the virtual fitting.

In the embodiment of the present disclosure, the overwriting is performed in a manner that the fourth preset boundary and the center of the fourth preset boundary of the to-be-tried-on apparel data of the trunk part of the two-dimensional human body basic posture coincide respectively with the fourth preset boundary and the center of the fourth preset boundary of the original apparel data of the trunk part of the two-dimensional human body posture, thereby further improving the authenticity of virtual fitting.

FIG. 10 is a flow chart of another implementation of step 504 in the method for processing data provided by an embodiment of the present disclosure. For the convenience of description, only the parts related to the embodiment of the present disclosure are shown, which shall be described below in details.

In an embodiment of the present disclosure, as shown in FIG. 10, on the basis of the steps of the method shown in FIG. 7, step 504 further comprises:

step 1001: stretching or rebounding the to-be-tried-on apparel data of the arm part of the two-dimensional human body basic posture in an extension direction of the arm part of the two-dimensional human body posture based on a tension of cloth physical property of original apparel and a tension of cloth physical property of to-be-tried-on apparel, so as to form an arm part containing to-be-tried-on apparel data that has been stretched or rebounded; and step 1002: stretching or rebounding the to-be-tried-on apparel data of the trunk part in the two-dimensional human body basic posture in an extension direction of the trunk part of the two-dimensional human body posture based on a tension of a cloth physical property of original apparel and a tension of a cloth physical property of to-be-tried-on apparel, so as to form a trunk part containing to-be-tried-on apparel data that has been stretched or rebounded.

As cloth physical properties of different apparel are different, different cloth physical properties reflect different tensions of apparel data. The cloth physical property of the to-be-tried-on apparel data are stretched or rebounded based on the tension of the cloth physical property of the original apparel data and the tension of the cloth physical property of the to-be-tried-on apparel data, thereby further improving the authenticity of the virtual fitting. In addition, in a case where the cloth physical property of the apparel is known, the tension of the cloth physical property of the apparel is definitely known.

Figure 11:
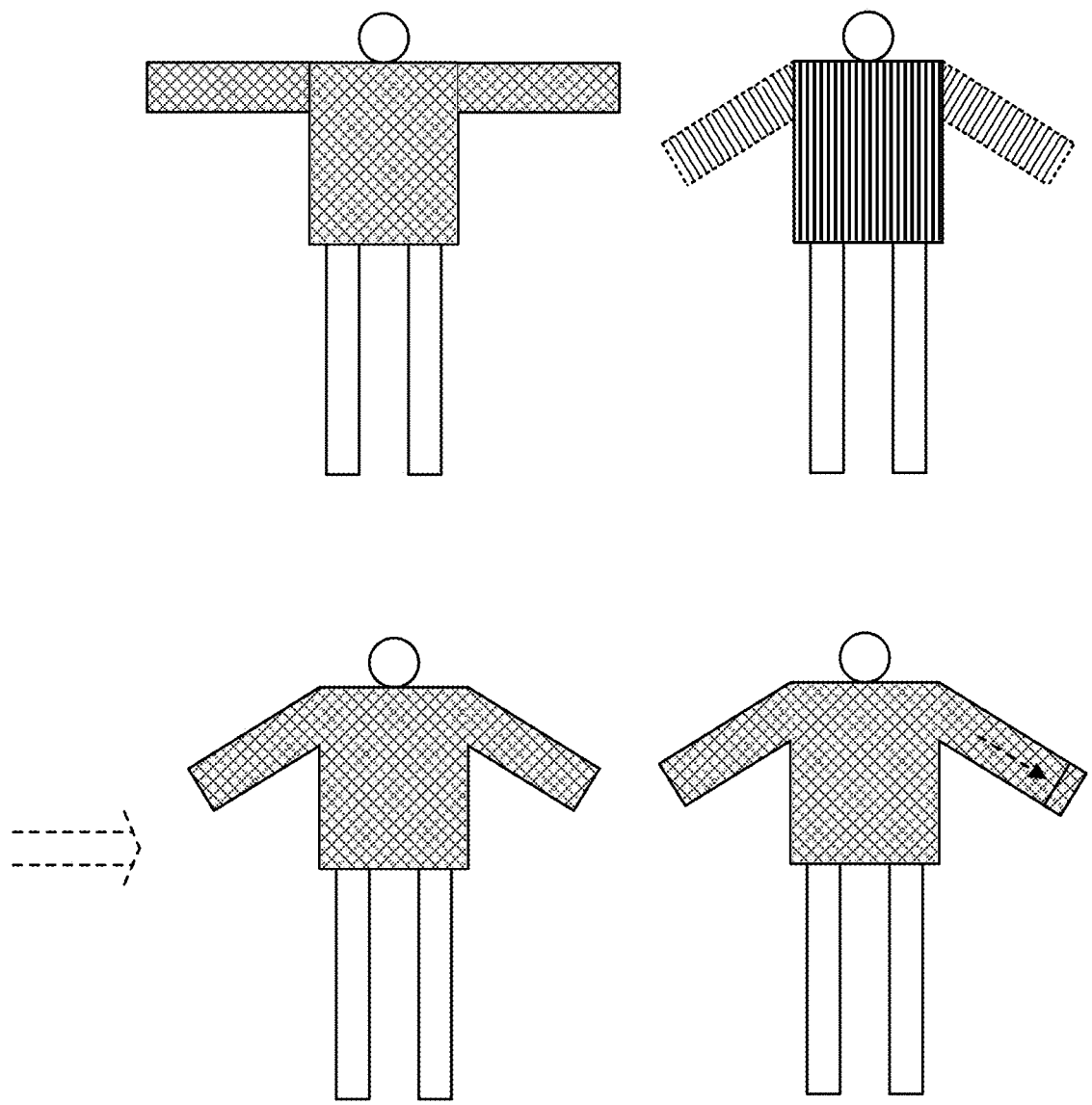
FIG. 11 is a schematic diagram of stretching and rebounding of the to-be-tried-on apparel data of the arm part provided by an embodiment of the present disclosure.

FIG. 11 is a schematic diagram of stretching and rebounding of the to-be-tried-on apparel data of the arm part provided by an embodiment of the present disclosure. For the convenience of description, only the parts related to the embodiment of the present disclosure are shown, which shall be described below in details.

As shown in FIG. 11, in an embodiment of the present disclosure, after the to-be-tried-on apparel data of the arm part of the two-dimensional human body basic posture overwrite the original apparel data of the arm part of the two-dimensional human body posture, a stretching scale of the arm part and a rebounding scale of the arm part are determined respectively based on the tension of the cloth physical property of the original apparel of the arm part and the tension of the cloth physical property of the to-be-tried-on apparel of the arm part.

Preferably, the stretching scale of the arm part or the rebounding scale of the arm part may be determined based on a difference between the tension of the cloth physical property of the original apparel of the arm part and the tension of the cloth physical property of the to-be-tried-on apparel of the arm part. For example, the stretching scale of the arm part or the rebounding scale of the arm part may be determined by a formula as below:

$$\Delta G_{12} = G_1 - G_2$$

wherein, $\Delta G_{12}$ denotes the stretching scale of the arm part or the rebounding scale of the arm part, $G_1$ denotes the tension of the cloth physical property of the original apparel of the arm part of the two-dimensional human body posture, and $G_2$ denotes the tension of the cloth physical property of the to-be-tried-on apparel of the arm part of the two-dimensional human body basic posture.

When the difference $\Delta G_{12}$ between the tension of the cloth physical property of the original apparel of the arm part and the tension of the cloth physical property of the to-be-tried-on apparel data of the arm part is a positive value, the difference $\Delta G_{12}$ therebetween is the stretching scale of the arm part. Therefore, the cloth physical property of the to-be-tried-on apparel of the arm part is stretched in the extension direction of the arm part of the two-dimensional human body posture (the arrow direction shown by the last figure of the arm part in FIG. 11) based on the stretching scale of the arm part, thereby forming the arm part containing to-be-tried-on apparel data that has been stretched.

When the difference $\Delta G_{12}$ between the tension of the cloth physical property of the original apparel of the arm part and the tension of the cloth physical property of the to-be-tried-on apparel of the arm part is a negative value, the difference $\Delta G_{12}$ therebetween is the rebounding scale of the arm part. Therefore, the cloth physical property of the to-be-tried-on apparel of the arm part is rebounded in a direction opposite to the extension direction of the arm part of the two-dimensional human body posture (a direction opposite to the arrow direction shown by the last figure of the arm part in FIG. 11) based on the rebounding scale of the arm part, thereby forming the arm part containing to-be-tried-on apparel data that has been rebounded.

In the embodiment of the present disclosure, the to-be-tried-on apparel data of the arm part is stretched or rebounded in the extension direction of the arm part in the two-dimensional human posture based on the tension of the cloth physical property of the original apparel and the tension of the cloth physical property of the to-be-tried-on apparel, thereby further improving the authenticity of virtual fitting.

FIG. 12 is a schematic diagram of stretching and rebounding of the to-be-tried-on apparel data of the trunk part provided by an embodiment of the present disclosure. For the convenience of description, only the parts related to the embodiment of the present disclosure are shown, which shall be described below in details.

As shown in FIG. 12, in an embodiment of the present disclosure, after the to-be-tried-on apparel data of the trunk part of the two-dimensional human body basic posture overwrite the original apparel data of the trunk part of the two-dimensional human body posture, the stretching scale or the rebounding scale of the trunk part is determined based on the tension of the cloth physical property of the original apparel of the trunk part and the tension of the cloth physical property of the to-be-tried-on apparel of the trunk part.

Preferably, the stretching scale of the trunk part or the rebounding scale of the trunk part may be determined based on a difference between the tension of the cloth physical property of the original apparel of the trunk part and the tension of the cloth physical property of the to-be-tried-on apparel of the trunk part. Specifically, the stretching scale of the trunk part or the rebounding scale of the trunk part may be determined by a formula as below:

$$\Delta G_{34} = G_3 - G_4$$

wherein, $\Delta G_{34}$ denotes the stretching scale of the trunk part or the rebounding scale of the trunk part, $G_3$ denotes the tension of the cloth physical property of the original apparel of the trunk part of the two-dimensional human body posture, and $G_4$ denotes the tension of the cloth physical property of the to-be-tried-on apparel of the trunk part of the two-dimensional human body basic posture.

The principle of the trunk part is similar to that of the above arm part. In general, the tension of the cloth physical property of the to-be-tried-on apparel of the trunk part of the two-dimensional human body basic posture is consistent with the tension of the cloth physical property of the to-be-tried-on apparel of the arm part of the two-dimensional human body basic posture, and the tension of the cloth physical property of the original apparel of the trunk part of the two-dimensional human body posture is consistent with the tension of the cloth physical property of the original apparel of the arm part of the two-dimensional human body posture.

When the difference $\Delta G_{34}$ between the tension of the cloth physical property of the original apparel of the trunk part and the tension of the cloth physical property of the to-be-tried-on apparel of the trunk part is a positive value, the difference $\Delta G_{34}$ therebetween is the stretching scale of the trunk part. Then the cloth physical property of the to-be-tried-on apparel of the trunk part is stretched in the extension direction of the trunk part of the two-dimensional human body posture (the arrow direction shown by the last figure of the arm part in FIG. 12) based on the stretching scale of the trunk part, thereby forming the trunk part containing to-be-tried-on apparel data that has been stretched.

When the difference $\Delta G_{34}$ between the tension of the cloth physical property of the original apparel of the trunk part and the tension of the cloth physical property of the to-be-tried-on apparel of the trunk part is a negative value, the difference $\Delta G_{34}$ therebetween is the rebounding scale of the trunk part. Then the cloth physical property of the to-be-tried-on apparel of the trunk part is rebounded in a direction opposite to the extension direction of the trunk part of the two-dimensional human body posture (a direction opposite to the arrow direction shown by the last figure of the arm part in FIG. 12) based on the rebounding scale of the trunk part, thereby forming the trunk part containing to-be-tried-on apparel data that has been rebounded.

In the embodiment of the present disclosure, the to-be-tried-on apparel data of the trunk part is stretched or rebounded in the extension direction of the trunk part in the two-dimensional human posture based on the tension of the cloth physical property of the original apparel and the tension of the cloth physical property of the to-be-tried-on apparel, thereby further improving the authenticity of virtual fitting.

FIG. 13 is a flow chart of a further implementation of step 504 of the method for processing data provided by an embodiment of the present disclosure. For the convenience of description, only the parts related to the embodiment of the present disclosure are shown, which shall be described below in details.

In an embodiment of the present disclosure, the preset body parts include a leg part. As shown in FIG. 13, in step 504, overwriting the original apparel data of each preset human body part of the two-dimensional human body posture with the to-be-tried-on apparel data of each preset human body part of the two-dimensional human body basic posture based on the posture change of each preset human body part of the two-dimensional human body posture, so as to form the two-dimensional human body posture containing the to-be-tried-on apparel data, comprises:

step 1301: overwriting original apparel data of the leg part of the two-dimensional human body posture with to-be-tried-on apparel data of the leg part of the two-dimensional human body basic posture, so as to form a leg part containing the to-be-tried-on apparel data; wherein a fifth preset vertex and a fifth preset boundary of the to-be-tried-on apparel data of the leg part of the two-dimensional human body basic posture coincide respectively with a fifth preset vertex and a fifth preset boundary of the original apparel data of the leg part of the two-dimensional human body posture, or a sixth preset boundary and a sixth preset boundary center of the to-be-tried-on apparel data of the leg part of the two-dimensional human body basic posture coincide respectively with a sixth preset boundary and a sixth preset boundary center of the original apparel data of the leg part of the two-dimensional human body posture.

For the leg part, the principle of overwriting the original apparel data with the to-be-tried-on apparel data is similar to that of the arm part and the trunk part. For the leg part, when overwriting the original apparel data with the to-be-tried-on apparel data, as the posture of the leg part is basically unchanged on a two-dimensional plane, the leg part on the two-dimensional plane may be approximately viewed as a regular square. Therefore, the to-be-tried-on apparel data of the leg part may directly overwrite the original apparel data of the leg part, thereby forming the leg part containing the to-be-tried-on apparel data.

The fifth preset vertex may be a left vertex of a contact position where the trunk part is in contact with the leg part, and the fifth preset boundary is formed by a contact part where the trunk part is in contact with the leg part. Specifically, when the overwriting is performed, the fifth preset vertex of the to-be-tried-on apparel data of the leg part of the two-dimensional human body basic posture coincides with the fifth preset vertex of the original apparel data of the leg part of the two-dimensional human body posture, and the fifth preset boundary of the to-be-tried-on apparel data of the leg part of the two-dimensional human body basic posture coincides with the fifth preset boundary of the original apparel data of the leg part of the two-dimensional human body posture, so as to complete the overwriting. In the embodiment of the present disclosure, the overwriting is performed in a manner that the fifth preset vertexes of the leg part coincide and the fifth preset boundaries of the leg part coincide, thereby further improving the authenticity of the virtual fitting.

In addition, the fifth preset vertex may also be other vertexes than the above vertexes, such as a right vertex of a contact position where the trunk part is in contact with the leg part, and the fifth preset boundary may also be other boundaries than the above boundaries, such as a left boundary or a right boundary of the leg part, which is not limited in the embodiment of the present disclosure.

In the embodiment of the present disclosure, the overwriting is performed in a manner that the fifth preset vertex and the fifth preset boundary of the to-be-tried-on apparel data of the leg part coincide respectively with the fifth preset vertex and the fifth preset boundary of the original apparel data of the leg part, thereby further improving the authenticity of virtual fitting.

In an embodiment of the present disclosure, the sixth preset boundary is formed by a contact part where the trunk part is in contact with the leg part, which is consistent with the fifth preset boundary in the above embodiment. Specifically, when the overwriting is performed, the sixth preset boundary of the to-be-tried-on apparel data of the leg part of the two-dimensional human body basic posture coincides with the sixth preset boundary of the original apparel data of the leg part of the two-dimensional human body posture, and the center of the sixth preset boundary of the to-be-tried-on apparel data of the leg part of the two-dimensional human body basic posture coincides with the center of the sixth preset boundary of the original apparel data of the leg part of the two-dimensional human body posture. In the embodiment of the present disclosure, the overwriting is performed in a manner that the sixth preset boundaries coincide and the centers of the sixth preset boundaries coincide, thereby further improving the authenticity of the virtual fitting.

In the embodiment of the present disclosure, the overwriting is performed in a manner that the sixth preset boundary and the center of the sixth preset boundary of the to-be-tried-on apparel data of the leg part of the two-dimensional human body basic posture coincide respectively with the sixth preset boundary and the center of the sixth preset boundary of the original apparel data of the leg part of the two-dimensional human body posture, thereby further improving the authenticity of virtual fitting.

FIG. 14 is a flow chart of still another implementation of step 504 of the method for processing data provided by an embodiment of the present disclosure. For the convenience of description, only the parts related to the embodiment of the present disclosure are shown, which shall be described below in details.

In an embodiment of the present disclosure, as shown in FIG. 14, on the basis of the steps of the method shown in FIG. 13, step 504 further comprises:

step 1401: stretching or rebounding the to-be-tried-on apparel data of the leg part of the two-dimensional human body basic posture in an extension direction of the leg part of the two-dimensional human body posture based on the tension of cloth physical property of the original apparel and the tension of cloth physical property of to-be-tried-on apparel, so as to form a leg part containing to-be-tried-on apparel data that has been stretched or rebounded.

Likewise, the principle of stretching or rebounding the to-be-tried-on apparel data of the leg part is similar to that of the arm part or the trunk part.

Specifically, after the to-be-tried-on apparel data of the leg part of the two-dimensional human body basic posture overwrite the original apparel data of the leg part of the two-dimensional human body posture, a stretching scale of the leg part or a rebounding scale of the leg part is determined based on the tension of the cloth physical property of the original apparel of the leg part and the tension of the cloth physical property of the to-be-tried-on apparel of the leg part.

Preferably, the stretching scale of the leg part or the rebounding scale of the leg part may be determined based on a difference between the tension of the cloth physical property of the original apparel of the leg part and the tension of the cloth physical property of the to-be-tried-on apparel of the leg part. Specifically, the stretching scale of the leg part or the rebounding scale of the leg part may be determined by a formula as below:

$$\Delta G_{56} = G_5 - G_6$$

wherein, $\Delta G_{56}$ denotes the stretching scale of the leg part or the rebounding scale of the leg part, $G_5$ denotes the tension of the cloth physical property of the original apparel of the leg part of the two-dimensional human body posture, and $G_6$ denotes the tension of the cloth physical property of the to-be-tried-on apparel of the leg part of the two-dimensional human body basic posture.

When the difference $\Delta G_{56}$ between the tension of the cloth physical property of the original apparel of the leg part and the tension of the cloth physical property of the to-be-tried-on apparel of the leg part is a positive value, the difference $\Delta G_{56}$ therebetween is the stretching scale of the leg part. Then the cloth physical property of the to-be-tried-on apparel of the leg part is stretched in the extension direction of the leg part of the two-dimensional human body posture based on the stretching scale of the leg part, thereby forming the leg part containing to-be-tried-on apparel data that has been stretched.

When the difference $\Delta G_{56}$ between the tension of the cloth physical property of the original apparel of the leg part and the tension of the cloth physical property of the to-be-tried-on apparel of the leg part is a negative value, the difference $\Delta G_{56}$ therebetween is the rebounding scale of the leg part. Then the cloth physical property of the to-be-tried-on apparel of the leg part is rebounded in a direction opposite to the extension direction of the leg part of the two-dimensional human body posture based on the rebounding scale of the leg part, thereby forming the leg part containing to-be-tried-on apparel data that has been rebounded.

In the embodiment of the present disclosure, the to-be-tried-on apparel data of the leg part of the two-dimensional human body basic posture are stretched or rebounded in the extension direction of the leg part of the two-dimensional human body posture based on the tension of the cloth physical property of the original apparel and the tension of the cloth physical property of the to-be-tried-on apparel, thereby further improving the authenticity of virtual fitting.

An embodiment of the present disclosure further provides an apparatus for processing data, as described in the following embodiments. Since the principle of technical solution of the apparatus is similar to that of the method for processing data, the method as described above may be referred to for implementation of the apparatus, and the repetitive description is omitted herein.

FIG. 15 is a diagram of functional modules of the apparatus for processing data provided by an embodiment of the present disclosure. For the convenience of description, only the parts related to the embodiment of the present disclosure are shown, which shall be described below in details.

Referring to FIG. 15, the modules of the apparatus for processing data are configured to execute the steps of an embodiment corresponding to FIG. 1. FIG. 1 and the description corresponding to FIG. 1 can be referred to for details of the steps, which will not be repeated herein. In an embodiment of the present disclosure, the apparatus for processing data comprises an image data acquisition module 1501, a posture identification module 1502, a posture matching module 1503 and a virtual fitting module 1504.

The image data acquisition module 1501 is configured to acquire image data including a fitted human body by an image acquisition device, the image data of the fitted human body reflecting projection data of a three-dimensional human body on a first plane perpendicular to a center line of a visual field of the image acquisition device.

The posture identification module 1502 is configured to identify a two-dimensional human body posture of the fitted human body based on the image data, the two-dimensional human body posture reflecting projection data of the three-dimensional human body on a second plane, the second plane being a symmetrical plane between a front side and a rear side of the fitted human body.

The posture matching module 1503 is configured to match the identified two-dimensional human body posture to a human body posture database to determine preset body parts of the two-dimensional human body posture.

The virtual fitting module 1504 is configured to assign cloth physical property of to-be-tried-on apparel to a part of the preset body parts of the two-dimensional human body posture covered by original apparel.

In the embodiment of the present disclosure, the image data acquisition module 1501 acquires the image data including the fitted human body by the image acquisition device, then the posture identification module 1502 identifies the two-dimensional human body posture of the fitted human body based on the image data, the posture matching module 1503 matches the identified two-dimensional human body posture to the human body posture database to determine the preset body parts of the two-dimensional human body posture, and finally the virtual fitting module 1504 assigns the cloth physical property of to-be-tried-on apparel to the part of the preset body parts of the two-dimensional human body posture covered by original apparel. In the embodiment of the present disclosure, there is no need to construct a three-dimensional human body model or an apparel model, and it is only needed to identify the two-dimensional human body posture of the fitted human body and directly assign the cloth physical property of to-be-tried-on apparel to the part of the preset body parts of the two-dimensional human body posture covered by original apparel, thereby greatly improving the efficiency of data processing and user experiences.

Figure 16:
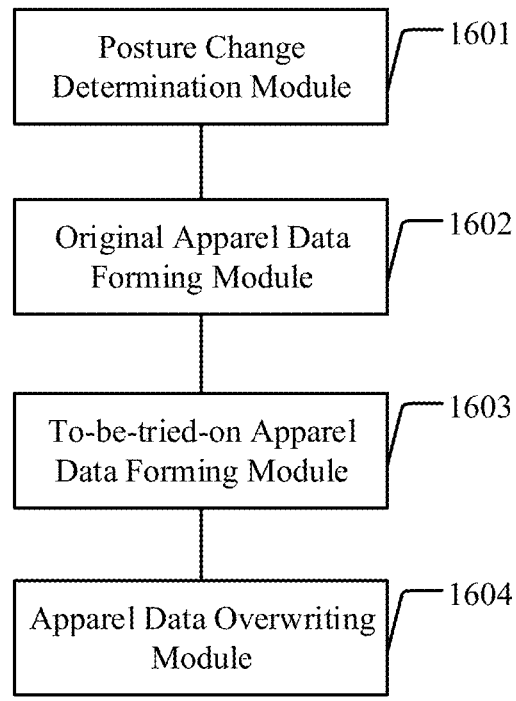
FIG. 16 is a diagram of the functional modules of the apparatus for processing data provided by another embodiment of the present disclosure.

FIG. 16 is another diagram of the functional modules of the apparatus for processing data provided by an embodiment of the present disclosure. For the convenience of description, only the parts related to the embodiment of the present disclosure are shown, which shall be described below in details.

In an embodiment of the present disclosure, referring to FIG. 16, modules of the apparatus for processing data are configured to execute the steps in the embodiment corresponding to FIG. 5. FIG. 5 and the description corresponding to FIG. 5 can be referred to for details of the steps, which will not be repeated herein. In the embodiment of the present disclosure, on the basis of the module structures shown in FIG. 15, the apparatus for processing data further comprises a posture change determination module 1601, an original apparel data forming module 1602, a to-be-tried-on apparel data forming module 1603, and an apparel data overwriting module 1604.

The posture change determination module 1601 is configured to determine a posture change of each preset human body part of the two-dimensional human body posture based on a two-dimensional human body basic posture, the two-dimensional human body basic posture being projection data of a three-dimensional basic human body model on the first plane.

The original apparel data forming module 1602 is configured to assign cloth physical property of original apparel to a preset human body part covered by original apparel in the basic posture of the two-dimensional human body posture to form original apparel data.

The to-be-tried-on apparel data forming module 1603 is configured to assign cloth physical property of to-be-tried-on apparel to a preset human body part of the two-dimensional human body basic posture covered by the to-be-tried-on apparel to form to-be-tried-on apparel data.

The apparel data overwriting module 1604 is configured to overwrite the original apparel data of each preset human body part of the two-dimensional human body posture respectively with the to-be-tried-on apparel data of each preset human body part of the two-dimensional human body basic posture based on the posture change of each preset human body part of the two-dimensional human body posture, so as to form a two-dimensional human body posture containing the to-be-tried-on apparel data.

In the embodiment of the present disclosure, the posture change determination module 1601 determines the posture change of each preset human body part of the two-dimensional human body posture based on the two-dimensional human body basic posture, the original apparel data forming module 1602 assigns the cloth physical property of the original apparel to the preset human body part covered by the original apparel of the two-dimensional human body posture to form original apparel data, the to-be-tried-on apparel data forming module 1603 assigns the cloth physical property of to-be-tried-on apparel to the preset human body part of the two-dimensional human body basic posture covered by the to-be-tried-on apparel to form the to-be-tried-on apparel data, and then the apparel data overwriting module 1604 overwrites the original apparel data of each preset human body part of the two-dimensional human body posture respectively with the to-be-tried-on apparel data of each preset human body part of the two-dimensional human body basic posture based on the posture change of each preset human body part of the two-dimensional human body posture, thereby improving the authenticity of the virtual fitting.

Figure 17:
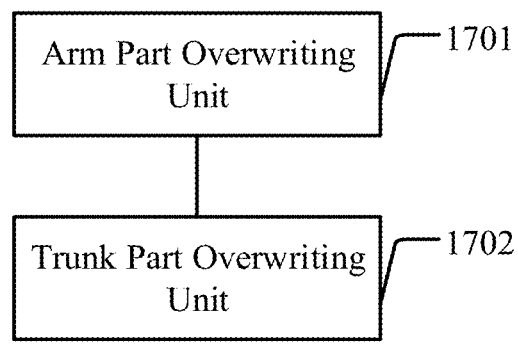
FIG. 17 is a structural block diagram of an apparel data overwriting module 1604 in the apparatus for processing data provided by an embodiment of the present disclosure.

FIG. 17 is a structural block diagram of an apparel data overwriting module 1604 in the apparatus for processing data provided by an embodiment of the present disclosure. For the convenience of description, only the parts related to the embodiment of the present disclosure are shown, which shall be described below in details.

In an embodiment of the present disclosure, the preset human body parts include an arm part and a trunk part. Referring to FIG. 17, units of the apparel data overwriting module 1604 are configured to execute the steps in the embodiment corresponding to FIG. 7. FIG. 7 and the relevant description in the embodiment corresponding to FIG. 7 can be referred to for details of the steps, which will not be repeated herein. In the embodiment of the present disclosure, the apparel data overwriting module 1604 comprises an arm part overwriting unit 1701 and a trunk part overwriting unit 1702.

The arm part overwriting unit 1701 is configured to overwrite original apparel data of the arm part of the two-dimensional human body posture with to-be-tried-on apparel data of the arm part of the two-dimensional human body basic posture based on a posture change of the arm part of the two-dimensional human body posture, so as to form an arm part containing the to-be-tried-on apparel data; wherein a first preset vertex and a first preset boundary of the to-be-tried-on apparel data of the arm part of the two-dimensional human body basic posture coincide respectively with a first preset vertex and a first preset boundary of the original apparel data of the arm part of the two-dimensional human body posture, or a second preset boundary and a second preset boundary center of the to-be-tried-on apparel data of the arm part of the two-dimensional human body basic posture coincide respectively with a second preset boundary and a second preset boundary center of the original apparel data of the arm part of the two-dimensional human body posture.

The trunk part overwriting unit 1702 is configured to overwrite original apparel data of the trunk part of the two-dimensional human body posture with to-be-tried-on apparel data of the trunk part of the two-dimensional human body basic posture, so as to form a trunk part containing the to-be-tried-on apparel data; wherein a third preset vertex and a third preset boundary of the to-be-tried-on apparel data of the trunk part of the two-dimensional human body basic posture coincide respectively with a third preset vertex and a third preset boundary of the original apparel data of the trunk part of the two-dimensional human body posture, or a fourth preset boundary and a fourth preset boundary center of the to-be-tried-on apparel data of the trunk part of the two-dimensional human body basic posture coincide respectively with a fourth preset boundary and a fourth preset boundary center of the original apparel data of the trunk part of the two-dimensional human body posture.

In the embodiment of the present disclosure, the arm part overwriting unit 1701 performs the overwriting in a manner that the first preset vertex and the first preset boundary of the to-be-tried-on apparel data of the arm part of the two-dimensional human body basic posture coincide respectively with the first preset vertex and the first preset boundary of the original apparel data of the arm part of the two-dimensional human body posture, or in a manner that the second preset boundary and the second preset boundary center of the to-be-tried-on apparel data of the arm part of the two-dimensional human body basic posture coincide respectively with the second preset boundary and the second preset boundary center of the original apparel data of the arm part of the two-dimensional human body posture, thereby further improving the authenticity of virtual fitting.

In the embodiment of the present disclosure, the trunk part overwriting unit 1702 performs the overwriting in a manner that the third preset vertex and the third preset boundary of the to-be-tried-on apparel data of the trunk part of the two-dimensional human body basic posture coincide respectively with the third preset vertex and the third preset boundary of the original apparel data of the trunk part of the two-dimensional human body posture, or in a manner that the fourth preset boundary and the fourth preset boundary center of the to-be-tried-on apparel data of the trunk part of the two-dimensional human body basic posture coincide respectively with the fourth preset boundary and the fourth preset boundary center of the original apparel data of the trunk part of the two-dimensional human body posture, thereby further improving the authenticity of virtual fitting.

Figure 18:
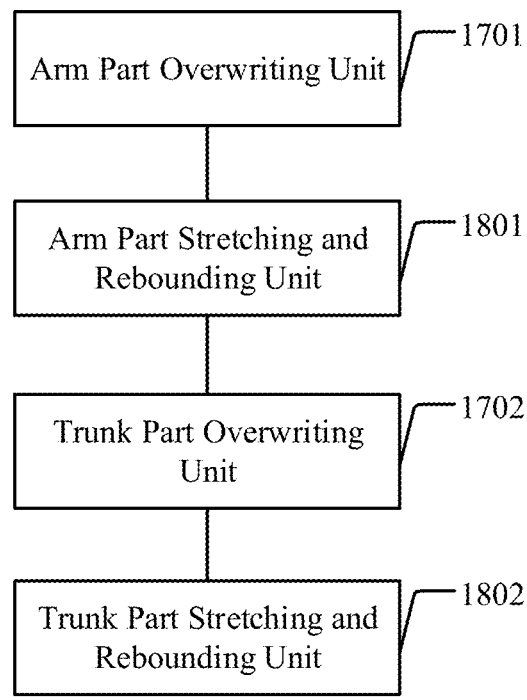
FIG. 18 is a structural block diagram of the apparel data overwriting module 1604 in the apparatus for processing data provided by another embodiment of the present disclosure.

FIG. 18 is another structural block diagram of the apparel data overwriting module 1604 in the apparatus for processing data provided by an embodiment of the present disclosure. For the convenience of description, only the parts related to the embodiment of the present disclosure are shown, which shall be described below in details.

In an embodiment of the present disclosure, referring to FIG. 18, units of the apparel data overwriting module 1604 are configured to execute the steps in the embodiment corresponding to FIG. 10. FIG. 10 and the relevant description in the embodiment corresponding to FIG. 10 can be referred to for details of the steps, which will not be repeated herein. In the embodiment of the present disclosure, on the basis of the unit structures shown in FIG. 17, the apparel data overwriting module 1604 further comprises an arm part stretching and rebounding unit 1801 and a trunk part stretching and rebounding unit 1802.

The arm part stretching and rebounding unit 1801 is configured to stretch or rebound the to-be-tried-on apparel data of the arm part of the two-dimensional human body basic posture in an extension direction of the arm part of the two-dimensional human body posture based on a tension of cloth physical property of original apparel and a tension of cloth physical property of to-be-tried-on apparel, so as to form an arm part containing to-be-tried-on apparel data that has been stretched or rebounded.

The trunk part stretching and rebounding unit 1802 is configured to stretch or rebound the to-be-tried-on apparel data of the trunk part of the two-dimensional human body basic posture in an extension direction of the trunk part of the two-dimensional human body posture based on a tension of cloth physical property of original apparel and a tension of cloth physical property of to-be-tried-on apparel, so as to form a trunk part containing to-be-tried-on apparel data that has been stretched or rebounded.

In the embodiment of the present disclosure, the arm part stretching and rebounding unit 1801 stretches or rebounds the to-be-tried-on apparel data of the arm part of the two-dimensional human body basic posture in the extension direction of the arm part of the two-dimensional human body posture based on the tension of cloth physical property of original apparel and the tension of cloth physical property of to-be-tried-on apparel, thereby further improving the authenticity of the virtual fitting.

In the embodiment of the present disclosure, the trunk part stretching and rebounding unit 1802 stretches or rebounds the to-be-tried-on apparel data of the trunk part of the two-dimensional human body basic posture in the extension direction of the trunk part of the two-dimensional human body posture based on the tension of cloth physical property of original apparel and the tension of cloth physical property of to-be-tried-on apparel, thereby further improving the authenticity of the virtual fitting.

Figure 19:
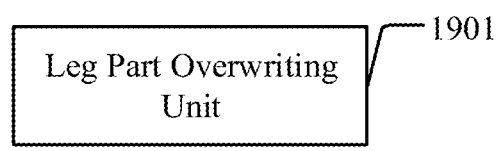
FIG. 19 is a structural block diagram of the apparel data overwriting module 1604 in the apparatus for processing data provided by a further embodiment of the present disclosure.

FIG. 19 is a further structural block diagram of the apparel data overwriting module 1604 in the apparatus for processing data provided by an embodiment of the present disclosure. For the convenience of description, only the parts related to the embodiment of the present disclosure are shown, which shall be described below in details.

In an embodiment of the present disclosure, the preset human body parts include a leg part. Referring to FIG. 19, units of the apparel data overwriting module 1604 are configured to execute the steps in the embodiment corresponding to FIG. 13. FIG. 13 and the relevant description in the embodiment corresponding to FIG. 13 can be referred to for details of the steps, which will not be repeated herein. In an embodiment of the present disclosure, the apparel data overwriting module 1604 comprises a leg part overwriting unit 1901.

The leg part overwriting unit 1901 is configured to overwrite original apparel data of the leg part of the two-dimensional human body posture with to-be-tried-on apparel data of the leg part of the two-dimensional human body basic posture, so as to form a leg part containing the to-be-tried-on apparel data; wherein a fifth preset vertex and a fifth preset boundary of the to-be-tried-on apparel data of the leg part of the two-dimensional human body basic posture coincide respectively with a fifth preset vertex and a fifth preset boundary of the original apparel data of the leg part of the two-dimensional human body posture, or a sixth preset boundary and a sixth preset boundary center of the to-be-tried-on apparel data of the leg part of the two-dimensional human body basic posture coincide respectively with a sixth preset boundary and a sixth preset boundary center of the original apparel data of the leg part of the two-dimensional human body posture.

In the embodiment of the present disclosure, the leg part overwriting unit 1901 performs the overwriting in a manner that the fifth preset vertex and the fifth preset boundary of the to-be-tried-on apparel data of the leg part of the two-dimensional human body basic posture coincide respectively with the fifth preset vertex and the fifth preset boundary of the original apparel data of the leg part of the two-dimensional human body posture, or in a manner that the sixth preset boundary and the sixth preset boundary center of the to-be-tried-on apparel data of the leg part of the two-dimensional human body basic posture coincide respectively with the sixth preset boundary and the sixth preset boundary center of the original apparel data of the leg part of the two-dimensional human body posture, thereby further improving the authenticity of the virtual fitting.

Figure 20:
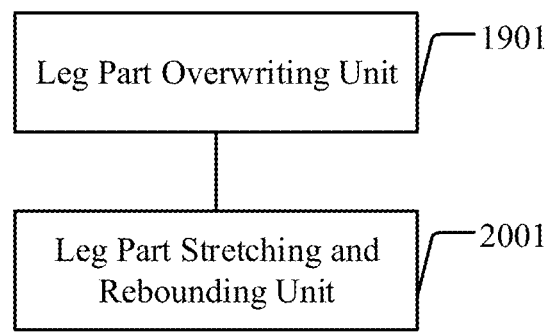
FIG. 20 is a structural block diagram of the apparel data overwriting module 1604 in the apparatus for processing data provided by still another embodiment of the present disclosure.

FIG. 20 is still another structural block diagram of the apparel data overwriting module 1604 in the apparatus for processing data provided by an embodiment of the present disclosure.

For the convenience of description, only the parts related to the embodiment of the present disclosure are shown, which shall be described below in details.

In an embodiment of the present disclosure, referring to FIG. 20, units of the apparel data overwriting module 1604 are configured to execute the steps in the embodiment corresponding to FIG. 14. FIG. 14 and the relevant description in the embodiment corresponding to FIG. 14 can be referred to for details of the steps, which will not be repeated herein. In the embodiment of the present disclosure, on the basis of the unit structures shown in FIG. 19, the apparel data overwriting module 1604 further comprises a leg part stretching and rebounding unit 2001.

The leg part stretching and rebounding unit 2001 is configured to stretch or rebound the to-be-tried-on apparel data of the leg part of the two-dimensional human body basic posture in an extension direction of the leg part of the two-dimensional human body posture based on the tension of cloth physical property of the original apparel and the tension of cloth physical property of to-be-tried-on apparel, so as to form a leg part containing to-be-tried-on apparel data that has been stretched or rebounded.

In the embodiment of the present disclosure, the leg part stretching and rebounding unit 2001 is configured to stretch or rebound the to-be-tried-on apparel data of the leg part of the two-dimensional human body basic posture in an extension direction of the leg part of the two-dimensional human body posture based on the tension of cloth physical property of the original apparel and the tension of cloth physical property of to-be-tried-on apparel, thereby further improving the authenticity of the virtual fitting.

In this description, color changes of pixels of the first plane and the second plane are synchronous.

An embodiment of the present disclosure further provides a computer device comprising a memory, a processor and a computer program stored in the memory and executable on the processor, wherein the processor is configured to execute the computer program to implement the method for processing data as described above.

An embodiment of the present disclosure further provides a computer-readable storage medium storing a computer program for implementing the method for processing data as described above.

In summary, in the embodiments of the present disclosure, the image data including the fitted human body are acquired by the image acquisition device, then the two-dimensional human body posture of the fitted human body is identified based on the image data, the two-dimensional human body posture is matched to the human body posture database to determine the preset body parts of the two-dimensional human body posture, and finally cloth physical property of to-be-tried-on apparel is assigned to the preset body part of the two-dimensional human body posture covered by original apparel. In the embodiment of the present disclosure, there is no need to construct a three-dimensional human body model or an apparel model, and it is only needed to identify the two-dimensional human body posture of the fitted human body, and directly assign the cloth physical property of to-be-tried-on apparel to the preset body part covered by original apparel in the two-dimensional human body posture, thereby greatly improving the efficiency of data processing and user experiences.

Those skilled in the art should understand that the embodiments of this disclosure can be provided as methods, systems or computer program products. Therefore, this disclosure may be implemented in the form of fully-hardware embodiments, fully-software embodiments, or combined software-hardware embodiments. In addition, this disclosure may employ the form of a computer program product implemented on one or more computer storage medium (including but not limited to disk memory, CD-ROM, and optical memory) containing computer programming code.

This disclosure is set forth by referring to flow charts and/or block diagrams for the methods, devices (systems), and computer program products of the embodiments. It should be understood that each process and/or block of the flow charts and/or block diagrams as well as combinations of the processes and/or boxes of the flow charts and/or block diagrams can be realized by computer program instructions. These computer program instructions can be provided to general-purpose computers, special-purpose computers, embedded processors or the processors of other programmable data processing devices to produce a machine, so that an apparatus for implementing the functions designated in one or more processes of the flowcharts and/or one or more blocks of the block diagrams can be produced by the instructions executed by the processor of the computer or other programmable data processing device.

These computer program instructions can also be stored in a computer-readable storage medium which can guide a computer or other programmable data processing device to operate in a particular way, so that an article of manufacture comprising an instruction apparatus can be produced by the instructions stored in the storage medium, with the instruction apparatus implementing the functions designated in one or more processes of the flowcharts and/or one or more blocks of the block diagram.

These computer program instructions may also be loaded onto a computer or other programmable data processing device to make the computer or other programmable data processing device perform a sequence of computer-implemented operations, so that the instructions executed by the computer or other programmable data processing device realize one or more processes of the flowcharts and/or one or more blocks of the block diagram.

The purpose, technical features and technical effects of the present disclosure have been further described above by means of some embodiments. It should be understood that the embodiments are meant to facilitate understanding of the principles of the present disclosure, rather than limit the scope of the present disclosure. Any modifications, alternations, improvements, etc., made by those skilled in the art without departing from the concepts and principles of this disclosure shall fall within the scope of the present disclosure.

The invention claimed is:

1. A method for processing data comprising:
acquiring image data including a fitted human body by an image acquisition device, the image data of the fitted human body reflecting projection data of a three-dimensional human body on a first plane perpendicular to a center line of a visual field of the image acquisition device;
identifying a two-dimensional human body posture of the fitted human body based on the image data, the two-dimensional human body posture reflecting projection data of the three-dimensional human body on a second plane, the second plane being a symmetrical plane between a front side and a rear side of the fitted human body;
matching the identified two-dimensional human body posture to a human body posture database to determine preset human body parts of the two-dimensional human body posture, wherein the human body posture database comprises many different two-dimensional human body postures; and
assigning a cloth physical property of to-be-tried-on apparel to a part of the preset human body parts of the two-dimensional human body posture covered by original apparel, comprising: overwriting the cloth physical property of the original apparel covered on the preset human body parts of the two-dimensional human body posture with the cloth physical property of to-be-tried-on apparel.

2. The method for processing data according to claim 1, wherein the first plane and the second plane are the same plane, or the first plane and the second plane are different planes.

3. The method for processing data according to claim 1, further comprising:
determining a posture change of each preset human body part of the two-dimensional human body posture based on a two-dimensional human body basic posture, the two-dimensional human body basic posture being projection data of a three-dimensional basic human body model on the first plane;
assigning a cloth physical property of original apparel to the preset human body part of the two-dimensional human body posture covered by original apparel to form original apparel data;
assigning the cloth physical property of to-be-tried-on apparel to the preset human body part of the two-dimensional human body basic posture covered by the to-be-tried-on apparel to form to-be-tried-on apparel data; and
overwriting the original apparel data of each preset human body part of the two-dimensional human body posture respectively with the to-be-tried-on apparel data of each preset human body part of the two-dimensional human body basic posture based on the posture change of each preset human body part of the two-dimensional human body posture, so as to form a two-dimensional human body posture containing the to-be-tried-on apparel data.

4. The method for processing data according to claim 3, wherein the preset human body parts comprise an arm part and a trunk part; overwriting the original apparel data of each preset human body part of the two-dimensional human body posture respectively with the to-be-tried-on apparel data of each preset human body part of the two-dimensional human body basic posture based on the posture change of each preset human body part of the two-dimensional human body posture, so as to form the two-dimensional human body posture containing the to-be-tried-on apparel data, comprises:
overwriting original apparel data of the arm part of the two-dimensional human body posture with to-be-tried-on apparel data of the arm part of the two-dimensional human body basic posture based on a posture change of the arm part of the two-dimensional human body posture, so as to form an arm part containing the to-be-tried-on apparel data; wherein a first preset vertex and a first preset boundary of the to-be-tried-on apparel data of the arm part of the two-dimensional human body basic posture coincide respectively with a first preset vertex and a first preset boundary of the original apparel data of the arm part of the two-dimensional human body posture, or a second preset boundary and a second preset boundary center of the to-be-tried-on apparel data of the arm part of the two-dimensional human body basic posture coincide respectively with a second preset boundary and a second preset boundary center of the original apparel data of the arm part of the two-dimensional human body posture; and
overwriting original apparel data of the trunk part of the two-dimensional human body posture with to-be-tried-on apparel data of the trunk part of the two-dimensional human body basic posture, so as to form a trunk part containing the to-be-tried-on apparel data; wherein a third preset vertex and a third preset boundary of the to-be-tried-on apparel data of the trunk part of the two-dimensional human body basic posture coincide respectively with a third preset vertex and a third preset boundary of the original apparel data of the trunk part of the two-dimensional human body posture, or a fourth preset boundary and a fourth preset boundary center of the to-be-tried-on apparel data of the trunk part of the two-dimensional human body basic posture coincide respectively with a fourth preset boundary and a fourth preset boundary center of the original apparel data of the trunk part of the two-dimensional human body posture.

5. The method for processing data according to claim 4, further comprising:
stretching or rebounding the to-be-tried-on apparel data of the arm part of the two-dimensional human body basic posture in an extension direction of the arm part of the two-dimensional human body posture based on a tension of the cloth physical property of the original apparel and a tension of the cloth physical property of the to-be-tried-on apparel, so as to form an arm part containing the to-be-tried-on apparel data that has been stretched or rebounded; and
stretching or rebounding the to-be-tried-on apparel data of the trunk part of the two-dimensional human body basic posture in an extension direction of the trunk part of the two-dimensional human body posture based on the tension of the cloth physical property of the original apparel and the tension of the cloth physical property of the to-be-tried-on apparel, so as to form a trunk part containing the to-be-tried-on apparel data that has been stretched or rebounded.

6. The method for processing data according to claim 3, wherein the preset human body parts comprise a leg part; overwriting the original apparel data of each preset human body part of the two-dimensional human body posture respectively with the to-be-tried-on apparel data of each preset human body part of the two-dimensional human body basic posture based on the posture change of each preset human body part of the two-dimensional human body posture, so as to form the two-dimensional human body posture containing the to-be-tried-on apparel data, comprises:

overwriting original apparel data of the leg part of the two-dimensional human body posture with to-be-tried-on apparel data of the leg part of the two-dimensional human body basic posture, so as to form a leg part containing the to-be-tried-on apparel data; wherein a fifth preset vertex and a fifth preset boundary of the to-be-tried-on apparel data of the leg part of the two-dimensional human body basic posture coincide respectively with a fifth preset vertex and a fifth preset boundary of the original apparel data of the leg part of the two-dimensional human body posture, or a sixth preset boundary and a sixth preset boundary center of the to-be-tried-on apparel data of the leg part of the two-dimensional human body basic posture coincide respectively with a sixth preset boundary and a sixth preset boundary center of the original apparel data of the leg part of the two-dimensional human body posture.

7. The method for processing data according to claim 6, further comprising:

stretching or rebounding the to-be-tried-on apparel data of the leg part of the two-dimensional human body basic posture in an extension direction of the leg part of the two-dimensional human body posture based on a tension of the cloth physical property of the original apparel and a tension of the cloth physical property of the to-be-tried-on apparel, so as to form a leg part containing the to-be-tried-on apparel data that has been stretched or rebounded.

8. An apparatus for processing data comprising:

an image data acquisition module configured to acquire image data including a fitted human body by an image acquisition device, the image data of the fitted human body reflecting projection data of a three-dimensional human body on a first plane perpendicular to a center line of a visual field of the image acquisition device;

a posture identification module configured to identify a two-dimensional human body posture of the fitted human body based on the image data, the two-dimensional human body posture reflecting projection data of the three-dimensional human body on a second plane, the second plane being a symmetrical plane between a front side and a rear side of the fitted human body;

a posture matching module configured to match the identified two-dimensional human body posture to a human body posture database to determine preset human body parts of the two-dimensional human body posture, wherein the human body posture database comprises many different two-dimensional human body postures; and a virtual fitting module configured to assign a cloth physical property of to-be-tried-on apparel to a part of the preset human body parts of the two-dimensional human body posture covered by original apparel, comprising overwriting the cloth physical property of the original apparel covered on the preset human body parts of the two-dimensional human body posture with the cloth physical property of to-be-tried-on apparel.

9. A computer device comprising a memory, a processor, and a computer program stored in the memory and executable on the processor, wherein the processor is configured to execute the computer program to implement the method for processing data according to any one of claims 1 to 7.

10. A non-transitory computer-readable storage medium storing a computer program for implementing the method for processing data according to any one of claims 1 to 7.

* * * * *